(12) United States Patent
Bell

(10) Patent No.: US 7,584,167 B1
(45) Date of Patent: *Sep. 1, 2009

(54) REAL ESTATE DISCLOSURE REPORTING METHOD

(76) Inventor: G. Randall Bell, 24161 Snipe La., Laguna Nigel, CA (US) 92677

( * ) Notice: Subject to any disclaimer, the term of this patent is extended or adjusted under 35 U.S.C. 154(b) by 203 days.

This patent is subject to a terminal disclaimer.

(21) Appl. No.: 10/873,992

(22) Filed: Jun. 22, 2004

Related U.S. Application Data

(63) Continuation of application No. 09/663,152, filed on Sep. 15, 2000, now Pat. No. 6,766,322.

(60) Provisional application No. 60/213,778, filed on Jun. 23, 2000.

(51) Int. Cl.
  *G06F 17/30* (2006.01)
(52) U.S. Cl. .................. 707/1; 707/5; 707/7; 707/10; 705/10; 705/51; 705/64
(58) Field of Classification Search ............... 707/1–10; 705/64, 10, 51
  See application file for complete search history.

(56) References Cited

U.S. PATENT DOCUMENTS

| | | | |
|---|---|---|---|
| 5,414,621 A | 5/1995 | Hough | |
| 5,419,209 A | 5/1995 | Sepe | |
| 5,857,174 A * | 1/1999 | Dugan | 705/1 |
| 6,594,633 B1 | 7/2003 | Broerman | |
| 6,711,554 B1 * | 3/2004 | Salzmann et al. | 705/64 |
| 2001/0039506 A1 * | 11/2001 | Robbins | 705/10 |
| 2002/0007336 A1 | 1/2002 | Robbins | |
| 2003/0229592 A1 * | 12/2003 | Florance et al. | 705/51 |

OTHER PUBLICATIONS

Randall Bell; Bell's Guide—The Comprehensive Real Estate Handbook, 2nd Ed.; 1991-1997; pp. 251-306 et al.; Melange Media Corp.; Littleton, CO USA.

Randall Bell; The RED Report—Real Estate Damages—Analytical Tools for Damaged Properties; 1996-1999; pp. 1-4; USA.

Randall Bell; Real Estate Damages—An Analysis of Detrimental Conditions; 1999; pp. 15-17, 46-197 et al; Appraisal Institute; Chicago, IL USA.

VISTAinfo; www.NearMyHome.com; Mar. 2, 2000; pp. 1-2; Internet Archive; San Francisco, CA, USA: www.archive.org.

VISTAinfo; "Randy Bell's Disaster Central;" Jan. 20, 2000; pp. 1-2; www.interactive101.com.

U.S. Appl. No. 10/136,746: filing receipt in 2 pages.

U.S. Appl. No. 10/136,746: application including specification, figures and claims in 84 pages.

U.S. Appl. No. 10/136,746: preliminary amendment filed Aug. 30, 2003 in 5 pages.

(Continued)

*Primary Examiner*—Don Wong
*Assistant Examiner*—Hanh B Thai
(74) *Attorney, Agent, or Firm*—Law Office of Glenn R. Smith

(57) ABSTRACT

A real estate disclosure reporting method compiles a plurality of items of disclosure. The items of disclosure are related according to a plurality of condition categories. A particular property is researched to determine a plurality of known ones of the items of disclosure, and the known ones are disclosed according to the condition categories.

20 Claims, 32 Drawing Sheets

OTHER PUBLICATIONS

U.S. Appl. No. 10/136,746: first office action mailed Sep. 13, 2004 in 5 pages.
U.S. Appl. No. 10/136,746: reply and declaration filed Oct. 11, 2004 in 12 pages.
U.S. Appl. No. 10/136,746: second office action mailed Jan. 19, 2005 in 7 pages.
U.S. Appl. No. 10/136,746: reply filed May 16, 2005 in 6 pages.
U.S. Appl. No. 10/136,746: third office action mailed Jul. 27, 2005 in 5 pages.
U.S. Appl. No. 10/136,746: reply filed Dec. 27, 2005 in 7 pages.
U.S. Appl. No. 10/136,746: fourth office action mailed Mar. 22, 2006 in 7 pages.
U.S. Appl. No. 10/136,746: pre-appeal brief filed Jun. 22, 2006 in 5 pages.
U.S. Appl. No. 10/136,746: notice of panel decision mailed Aug. 15, 2006 in 2 pages.
U.S. Appl. No. 10/136,746: appeal brief transmittal and (amended) appeal brief filed Mar. 5, 2007 in 23 pages.
U.S. Appl. No. 10/136,746: fifth office action mailed Jun. 26, 2007 in 15 pages.

* cited by examiner

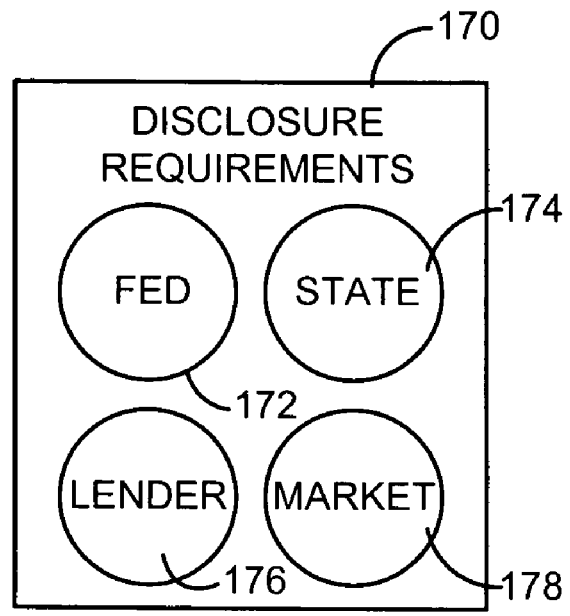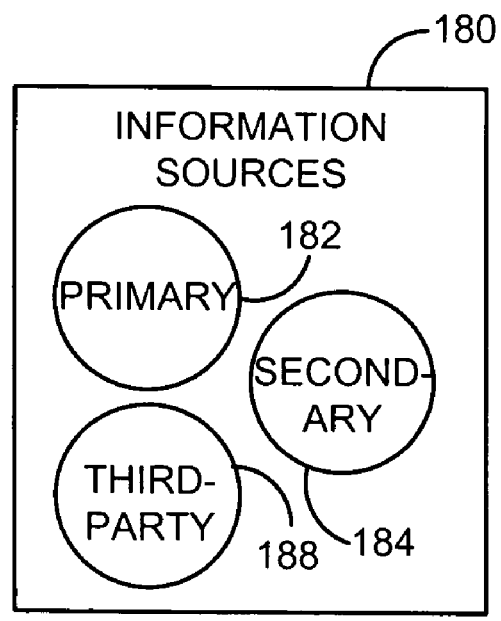
FIG. 1B

```
                                    ┌─ 300
                                    ▼
┌─────────────────────────────────────────────────────────┐
│ Client/User of Report _____ Date of Disclosure ____│
│ Subject Property Address _____│
│ Property Type: ☐ Residential   ☐ Commercial  ┌─182      │◄─┐
│ Primary:       ☐ Personal Knowledge ☐ Owner Interview   │  │
│ Secondary:     ☐ Government ☐ Police ☐ Internet ☐ Profile ☐ Other │ 310
│ Third-Party    ☐ Appraisal ☐ Architectual Plans ☐ Aerial Photos...│
│ Sources:       ☐ Escrow Docs ☐ Insurance Policies ☐ Leases...     │◄─┐
│           ┌─☐ Police Reports ☐ Site Survey ☐ Soil Report...       │  │
│         307  ☐ Termite Report ☐ Title Report ☐ Other  \-188       │ 320
├─────────────────────────────────────────────────────────┤
│ GENERAL CONDITIONS  ☐ As noted below  ☐ See Appraisal Report │
│ Building Area _____ Owner of Title _____ │
│ Land Area     _____ Market Conditions_____ │
│ Occupancy     _____ Sales History _____ │─ 308
│ ☐ Other                                  132            │
├─────────────────────────────────────────────────────────┤
│                                                         │
│                          ●                              │
│                                                         │
│                          ●                              │
│                                                         │
│                          ●                              │
│                                                         │
├─────────────────────────────────────────────────────────┤
│ CONSERVATION CONDITIONS  ☐ No known  ☐ Items as noted   │◄─┐
│ ☐ Conservation Area   ☐ Cultural Resource  ☐ Endangered Species │
│ ☐ Habitat Area        ☐ Moratorium         ☐ Natural Resource   │ 309
│ ☐ Shoreland           ☐ Wetlands           ☐ Other              │
├─────────────────────────────────────────────────────────┤
│ NATURAL CONDITIONS       ☐ No known  ☐ Items as noted   │
│ ☐ Avalanche     ☐ Earthquake    ☐ Fire Hazard   ☐ Flood Hazard │
│ ☐ Hurricane     ☐ Tidal Wave    ☐ Seismic Issues ☐ Tornado     │
│ ☐ Volcano       ☐ Wildland      ☐ Other                        │
└─────────────────────────────────────────────────────────┘
```

☐ See Attached

THIS REPORT MAY ONLY BE USED BY THE SPECIFIED CLIENT OR USER. THIS REPORT IS NOT A WARRANTY OR GUARANTEE THAT CERTAIN CONDITIONS DO NOT EXIST, BUT IT IS A DISCLOSURE OF WHAT CONDITIONS ARE BELIEVED OR KNOWN TO EXIST TO THE PARTY(IES) BELOW BASED ONLY UPON THOSE SOURCES CITED, AS OF THE DATE OF THIS REPORT.

THIS INFORMATION HAS BEEN GATHERED FROM SOURCES WHICH ARE BELIEVED TO BE RELIABLE, BUT NO ATTEMPT HAS BEEN MADE TO INDEPENDENTLY VERIFY THIS INFORMATION AND NO GUARANTEE OR WARRANTY IS MADE AS TO THE ACCURACY THEREOF. NO LIABILITY IS ACCEPTED FOR ANY LOSS, INJURY, LIABILITY OR DAMAGE OF ANY KIND RESULTING IN ANY WAY FROM (A) ANY ERRORS OR OMISSIONS OF THE INFORMATION, (B) THE UNAVAILABILITY, INTERRUPTION OR DELAY OF THE DELIVERY OF THE INFORMATION TO THE CLIENT OR THIRD PARTY, OR (C) THE USE OF THIS INFORMATION.

353

THIS REPORT IS NOT A SUBSTITUTE FOR ANY THIRD-PARTY DOCUMENTS OR REPORTS, SUCH AS APPRAISAL REPORTS, ARCHITECTURAL PLANS, AERIAL PHOTOS, BROKER DOCUMENTS, CONTRACTS, ENVIRONMENTAL IMPACT REPORTS, ESCROW-SALES DOCUMENTS, INSURANCE DOCUMENTS, LEASE DOCUMENTS, LEGAL DOCUMENTS, LOAD DOCUMENTS, PHASE I, II, III REPORTS, SHERIFF-POLICE REPORTS, PROPERTY INSPECTION REPORTS, SITE SURVEYS, SOILS REPORTS, SPECIAL STUDIES, TERMITE REPORTS, TITLE REPORTS OR ANY OTHER STUDIES OR DOCUMENTS. ANY THIRD PARTY DOCUMENTS THAT HAVE BEEN REFERENCED ARE ASSUMED TO BE CORRECT AND NO WARRANTY IS MOADE AS TO THEIR ACCURACY. BY ACCEPTANCE OF THIS REPORT, THE RECIPIENT ACKNOWLEDGES THAT THERE IS NO GUARANTEE OR WARRANTY AS TO THE ACCURACY OF THIS INFORMATION. IF THE RECIPIENT OF THIS REPORT HAS ANY CONCERNS REGARDING ANY ITEMS OF DISCLOSURE, IT IS RECOMMENDED THAT A QUALIFIED APPRAISER, ARCHITECT, ATTORNEY, BROKER-AGENT, CONTRACTOR, SOILS ENGINEER, ENVIRONMENTAL ENGINEER, GOVERNMENTAL AGENT, INSURANCE AGENT, SURVEYOR, CONTRACTOR, PROPERTY INSPECTOR OR OTHER PROFESSIONAL BE CONSULTED.

360

370

CONDITIONS ACCEPTED:_____ Date:_____

Prepared By:                          Supervisor: ☐ Inspected Property

Signature _____        Signature _____
Name _____         Name _____
Title _____        Title _____
Date Report Signed _____        Date Report Signed _____
License # _____ State ___       License # _____ State ___
Certification # _____ State ___    Certification # _____ State ___

**II
TRANSACTIONAL
CONDITIONS**

Assemblage
Auction
Bankruptcy
Build to Suit
Double Escrow
Dual Agency — 132
Estate Sale
Financing
Forclosure
FDIC Sale
Feng Shui
Lease Option
Probate
Purchase Option
REO Sale
Right of Refusal
Sales - Leaseback
Short Sale
Special Motivation
Tenant Purchase
US Marshal Sale
Other

III
DISTRESS
CONDITIONS

Accident
Arson
Burglary
Citation
Crime Scene
Criminal Activity      ↖ 132
Death on Property
Drug Activity
Fire
Homicide
Megan's Law
Notice
Suicide
Vandalism
Other

**IV
LEGAL
CONDITIONS**

Assessments
Association Dues
Bonds
CC&Rs
Deed Restrictions
Easements          132
Eminent Domain
Encroachments
Entitlements
Federal Historic Site
Ground Lease
Historic Site
Insurance Claims
Leases
Legal Actions
Loans
Title Issues
Zoning Issues
Other

**V
EXTERNAL
CONDITIONS**

Airport
Arenas
Cell AM/FM Tower
Cemetery
Colleges
Dam          132
Daycare
Jail or Prison
Military Airport
National Parks
Noise
Non-Conforming
Nuisance
Odors-Smoke
Pipelines
Places of Worship
Power Lines
Proposed Development
Railway
Schools
Tower Fall Zone
Traffic Issue
Tunneling
Other

**VI
BUILDING
CONDITIONS**

ADA (commercial)
Construction Defect
EIFS
Fire Sprinklers Required
Infestation
Leakage
Legal Nonconformance
Molds-Rot
Non-Permit Issues
Repairs Needed      132
Steps-No Handrails
Termites
Wall-Soil Contact
Other

**VII
SITE
CONDITIONS**

Basin
Cracking
Creek/Pond
Drainage
Expansion
Fill Soil         ↖ 132
Landslide-Slide
Liquefaction
Movement
Pits
Ponding
Settlement
Sink Hole
Slope Creep
Subsidence
Watershed
Other

**VIII
ENVIRONMENTAL
CONDITIONS**

Air Pollution
Asbestos
Biological
CERCLA - Active
CERCLA - Inactive
Federal Superfund      132
Formaldehyde
Hazardous Materials
Hydrocarbons
Lead-Based Paint
Lead Pipes
LUST
Metals
Nuclear Plants
Oil/Gas Wells
Pests/Insecticides
Radioactive
Radon
Septic Tanks
Sewage Plant
Soil Contamination
Solid Waste
Solvents
State Superfund
Transformers
Treatment -Storage
UST
Water Contamination
Other

**IX
CONSERVATION
CONDITIONS**

Archeological
Conservation Area
Cultural Resource
Endangered Species
Habitat Area
Moratorium
Natural Resource
Shoreland
Wetlands
Other

GOVERNMENT RECORDS

ADA
Archeological
Avalanche
Building Permits
Citations
Conservation       112
Dam
Eminent Domain
Entitlements
Fall Zone
Fire Sprinklers
Historic Site
Notices
Occupancy Permit
Proposed Development
Septic Tank
Setback
Zoning
Other

OTHER
(Maps, Market Studies, MLS, Misc.)

Association Dues
CC&Rs
Other

REAL ESTATE DISCLOSURE REPORTING METHOD

CROSS-REFERENCE TO RELATED APPLICATIONS

This application is a continuation of U.S. patent application Ser. No. 09/663,152 filed Sep. 15, 2000, now U.S. Pat. No. 6,766,322 entitled Real Estate Disclosure Reporting Method, which relates to and claims the benefit of U.S. Provisional Application No. 60/213,778 filed Jun. 23, 2000, entitled Real Estate Disclosure Reporting Method. All of the aforementioned prior applications incorporated by reference herein.

BACKGROUND OF THE INVENTION

The disclosure of real estate conditions is a critical element in any property transaction and plays an increasingly important role for property owners and their attorneys, agents, brokers, appraisers, inspectors and other consultants. Federal and state laws, lender policies and regulations, as well as demands by prospective buyers create a considerable demand for the full disclosure of any potential detrimental conditions. Notwithstanding government requirements, there are several reasons that a full real estate disclosure is beneficial. Buyers obtain better knowledge of what they are purchasing, and a full disclosure helps shield sellers, brokers and appraisers from future liability. Also, lenders obtain a better understanding of their collateral asserts. Real estate disclosure does not put any dollar figure on any conditions. Rather, a proper disclosure report simply informs the user of the report that certain conditions are known or believed to exist.

SUMMARY OF THE INVENTION

Historically, the disclosure of conditions that might impact property values or purchase decisions has been a fragmented topic. There does not exist a single, universal disclosure report. Some states require disclosure and others do not. Appraisers and property inspectors disclose some conditions but not all of them. Most real estate professionals issue reports with long boilerplate disclaimers specifically citing that they did not investigate a variety of issues, even though these issues could have a material impact on the property's value or the decision to buy or lend.

One aspect of a real estate disclosure reporting method comprises the steps of compiling a plurality of items of disclosure and relating the items of disclosure according to a plurality of condition categories. Additional steps include researching a particular property to determine a plurality of known ones of the items of disclosure and disclosing the known ones according to the condition categories.

Another aspect of a real estate disclosure reporting method comprises the steps of providing a web page media and listing a plurality of known items of disclosure for a specific property on the web page media. Additional steps include categorizing the known items of disclosure on the web page media according to a plurality of real estate conditions and downloading the web page media to a browser over the Internet.

A further aspect of a real estate disclosure reporting method comprises the steps of identifying a subject property and researching the property to determine a plurality of known items of disclosure. The known items of disclosure are reported according to a plurality of condition categories.

BRIEF DESCRIPTION OF THE DRAWINGS

FIGS. 1A-B are a general block diagram of a real estate disclosure reporting method;

FIGS. 3A-B are a real estate disclosure form and a supplemental disclosure form, respectively;

FIGS. 10A-J are tables of ID categories and associated priority IDs;

FIG. 10A is a table listing IDs associated with general conditions;

FIG. 10B is a table listing IDs associated with transactional conditions;

FIG. 10C is a table listing IDs associated with distress conditions;

FIG. 10D is a table listing IDs associated with legal conditions;

FIG. 10E is a table listing IDs associated with external conditions;

FIG. 10F is a table listing IDs associated with building conditions;

FIG. 10G is a table listing IDs associated with soil conditions;

FIG. 10H is a table listing IDs associated with environmental conditions;

FIG. 10I is a table listing IDs associated with conservation conditions; and

FIG. 10J is a table listing IDs associated with natural conditions; and

FIGS. 11A-E are tables listing IDs that can be determined from researching particular types of secondary information sources;

FIG. 11A is a table listing IDs from government records;

FIG. 11B is a table listing IDs from police records;

FIG. 11C is a table listing IDs from Internet databases;

FIG. 11D is a table listing IDs from property profiles; and

FIG. 11E is a table listing IDs from other secondary information sources.

DETAILED DESCRIPTION OF THE PREFERRED EMBODIMENTS

Real Estate Disclosure Reporting

Figure 1A:
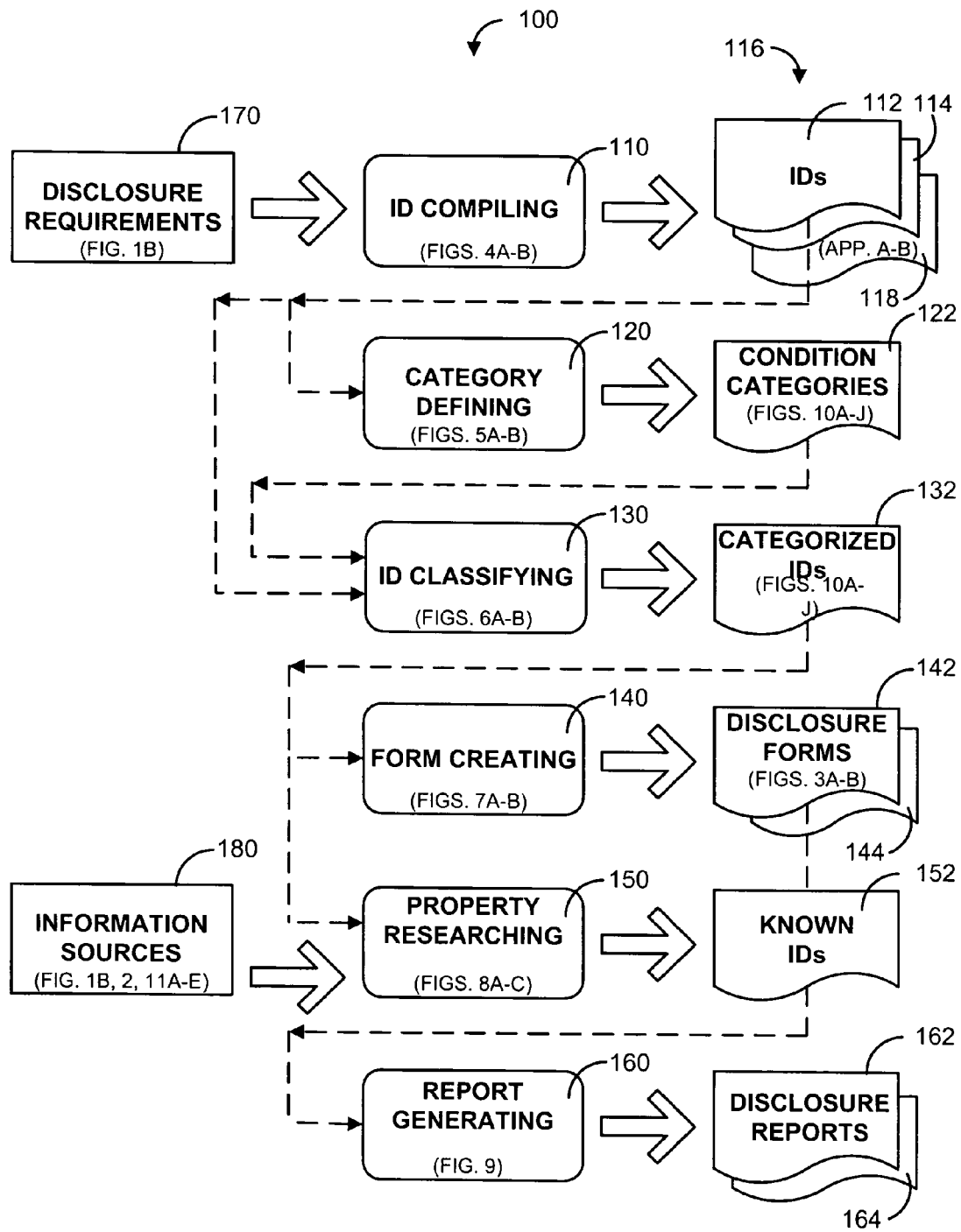

FIGS. 1A-B illustrate an embodiment of the real estate disclosure reporting method. The reporting method 100 has an ID compiling process 110, a category defining process 120, an ID classifying process 130, a form creating process 140, a property researching process 150, and a report generating process 160. The compiling process 110 has as inputs various disclosure requirements 170 and outputs a master compilation of items of disclosure (IDs) 116. The disclosure requirements 170 provide the legal and ethical framework for a variety of conditions that real estate professionals should disclose to parties that purchase or lend on a property. These disclosure requirements 170 include conditions that should be disclosed under federal law 172 and various state laws 174, conditions that lenders typically consider when deciding to provide a loan secured by property 176 and conditions that otherwise might impact the market value of property 178. The ID compiling process 110 utilizes these federal 172, state 174, lender 176 and market disclosure requirements 178 to identify various real estate related conditions and to determine those conditions which should be disclosed. These master IDs 116 include priority IDs 112, non-priority IDs 114, and associated definitions 118. The priority IDs 112 determined by a particular application of the ID compiling process 110 include over one hundred conditions, listed in FIGS. 10A-J and described in the Priority ID Glossary, Appendix A. Additional IDs are described in the Non-Priority ID Glossary, Appendix B. The ID compiling process 110, the priority IDs 112 and the non-priority IDs 114 are described in further detail with respect to FIGS. 4A-B, below.

As shown in FIG. 1A, the ID classifying process 130 has condition categories 122 and the priority IDs 112 as inputs and categorized IDs 132 as an output. The category defining process 120 generates the condition categories 122, which are general descriptions of various real estate conditions. The ID classifying process 130 associates various subsets of the priority IDs 112 with each of the condition categories 122, resulting in the categorized IDs 132. Advantageously, the categorized IDs 132 provide a tool for systematically performing the property researching process 150. In one embodiment, there are ten condition categories 122. The IDs can be classified according to these ten categories 122 as described with respect to FIGS. 10A-J, below. The category defining process 120 is described in further detail with respect to FIGS. 5A-B, below. The ID classifying process 130 is described in further detail with respect to FIGS. 6A-B, below.

Also shown in FIGS. 1A-B, the property researching process 150 utilizes various information sources 180 and the categorized IDs 132 as inputs, applies these inputs to research a particular property of interest and outputs known IDs 152 for that property. The information sources 180 are characterized as primary sources 182, secondary sources 184 and third-party sources 188. Primary information sources 182 are the property itself and the property owner. Secondary information sources 184 comprise various publicly available records, databases and documents, which can be accessed for free or for a fee through an agency. Third-party information sources 188 comprise various reports, studies, plans, surveys and other documents that have been compiled by third-parties. The property researching process 150 utilizes the information sources 180 to determine if any of the IDs are known to exist and to garner associated details with respect to those IDs. The resulting known IDs 152 are the collective information gathered for disclosure of a property's condition. The information sources 180 are described in further detail with respect to FIG. 2 and FIGS. 11A-E, below. The property researching process 150 is described in further detail with respect to FIGS. 8A-C, below.

FIG. 1A further shows that the report generating process 160 has disclosure forms 142, 144 and known IDs 152 as inputs and outputs disclosure reports 162, 164. The form creating process 140 generates a primary disclosure form 142 and a supplemental disclosure form 144. The primary disclosure form 142 displays priority IDs 112 according to condition categories 122 along with a convenient way of indicating known IDs 152. The supplemental disclosure form 144 provides blank areas for entering disclosure details, provides pre-printed legal disclaimers and provides signature lines.

The disclosure forms 142, 144 are advantageous tools for systematically performing the report generating process 160. The report generating process 160 involves documenting information regarding the known IDs 152 into a primary disclosure report 162 and supplemental reports 164. The primary disclosure report 162 provides a logical organization and presentation of a property's condition based upon the known IDs 152. The supplemental reports 164 document details associated with particular ones of the known IDs 152, provide notice of legal disclaimers, and are signed to acknowledge the disclosed conditions. The report generating process 160 could be partially or wholly incorporated within the property researching process 150 if the disclosure forms 142, 144 are completed as the information sources 180 are consulted. In that case, completed disclosure forms 142, 144 incorporating the known IDs 152 become partially or wholly completed disclosure reports 162, 164. Particular embodiments of the disclosure forms 142, 144 are described with respect to FIGS. 3A-B, below. The form creating process 140 is described in further detail with respect to FIGS. 7A-B, below. The report generating process 160 is described in further detail with respect to FIG. 9, below.

Information Sources

Figure 2:
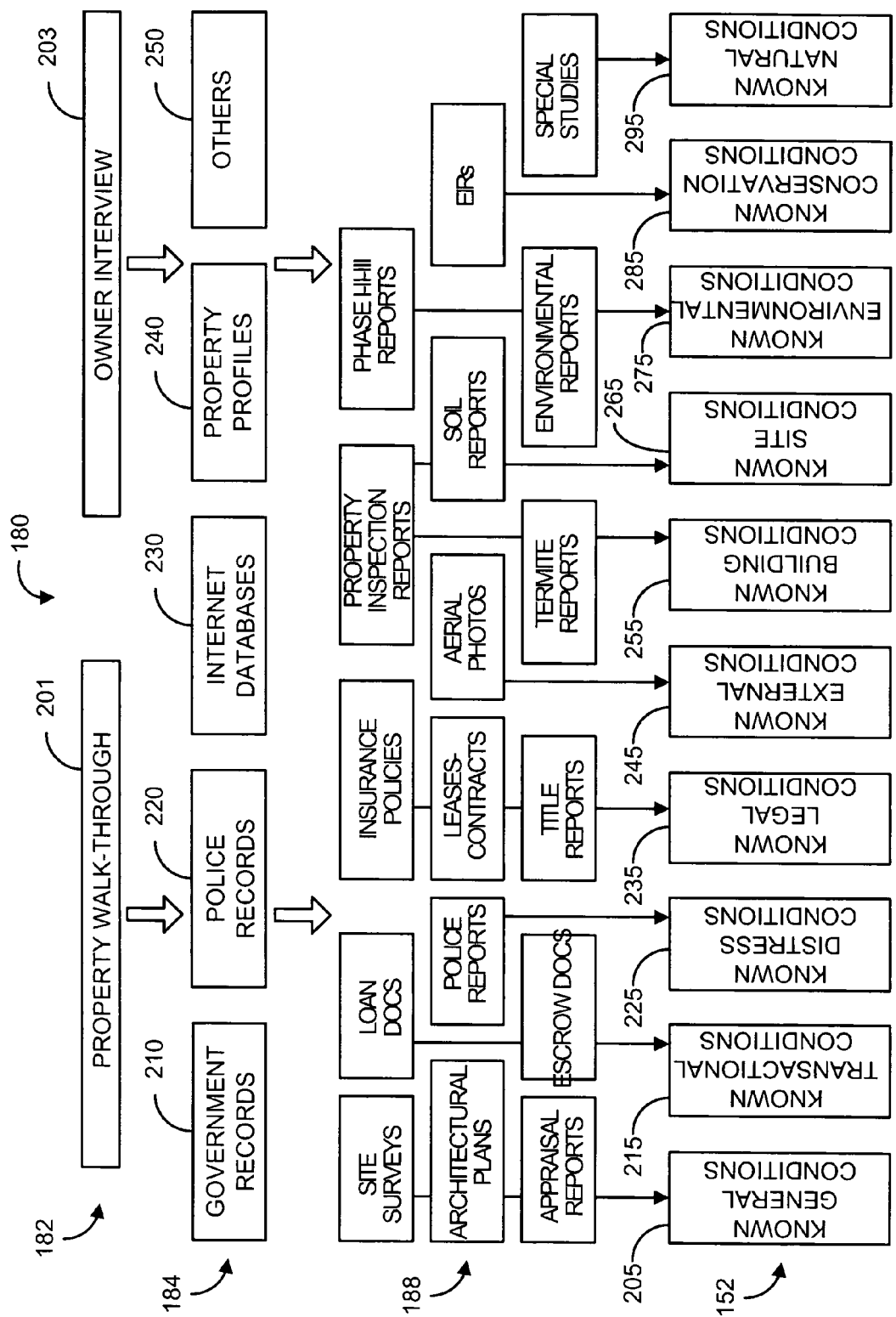
FIG. 2 is a detailed block diagram of information sources for researching a property.

FIG. 2 illustrates the information sources 180 used in the researching process 150 (FIG. 1A). As shown in FIG. 2, primary information sources 182 are utilized to determine if any IDs are known for a specific property. In particular, a researcher, typically a real estate professional, conducts a property walk-through 201, obtaining personal knowledge of any IDs through direct observation of the property itself and the area surrounding the property. Also, the researcher conducts an interview 203 of the property owner, obtaining the owner's personal knowledge of any IDs for the property and the surrounding area. These primary sources are applicable to any of the categories of known IDs 152.

Shown in FIG. 2, secondary information sources 184 are also utilized to determine if any IDs are known for a specific property. In a particular embodiment, these secondary sources 184 include government records 210, police records 220, Internet-searchable databases 230, property profiles 240 and other secondary information 250 that is publicly available and relevant to the property, such as association dues, CC&R's, maps and MLS information. As examples, a researcher might visit a city planning department to access government records regarding zoning, building permits and similar IDs. Also, the researcher could contact a title company for a property profile to determine assessments, bonds, building and land area, title ownership and similar IDs. Further, the researcher could visit the local police depart to request information under Megan's Law, records of crime activity on or near the property, and similar IDs. In addition, the researcher could utilize the services of a real-estate-based Internet information provider, for a fee, to access a database of location-specific real estate information. These secondary sources 184 are applicable to any of the categories of the known IDs 152. IDs that can be researched utilizing each of these secondary sources 184 are described with respect to FIGS. 11A-E, below.

FIG. 2 further shows that various third-party information sources 188 are used to determine if any IDs are known for a specific property. In a particular embodiment, these third-party sources 188 include site surveys, architectural plans and appraisal reports that can determine known IDs categorized as general conditions 205. Loan documents and escrow documents can determine known IDs categorized as transactional conditions 215. Police reports can determine known IDs categorized as distress conditions 225. Insurance policies, leases and contracts and title reports can determine known IDs categorized as legal conditions 235. Aerial photos can determine known IDs categorized as external conditions 245. Property inspection reports and termite reports can determine known IDs categorized as building conditions 255. In addition, property inspection reports along with soil reports can determine known IDs categorized as site conditions 265. Phase I-II-III reports and environmental reports can determine known IDs categorized as environmental conditions 275. Environmental impact reports can determine known IDs categorized as conservation conditions 285, and special studies can determine known IDs categorized as natural conditions 295.

Disclosure Forms

FIGS. 3A-B illustrate disclosure forms 300, 350, which can be used for specifying known IDs 152 (FIG. 1A) and providing a disclosure report 162, 164 (FIG. 1A), as described above. FIG. 3A illustrates a primary disclosure form 300, which is partitioned into an introduction section 301 and multiple categorized sections 303. The introduction section 301 has a background portion 310 and an information source portion 320. The background portion 310 provides information regarding the report user, the disclosure date, property location and the property type, such as commercial or residential. The information source portion 320 has a list of the primary sources 182, secondary sources 184 and third-party sources 188, as described with respect to FIG. 2, above. Proximate to each of the listed sources 182, 184, 188 is an indicator area 307 for specifying that a particular source was utilized for determining known IDs. The indicator area 307 may be a check box for placing a checkmark or an "x."

As shown in FIG. 3A, each of the categorized sections 303 correspond to one of the condition categories 122 (FIG. 1A) described above. Accordingly, each of the categorized sections 303 has a label 305 that identifies the particular condition category 122 (FIG. 1A) to which the categorized section 303 corresponds. Listed within each of the categorized sections 303 are categorized IDs 132 corresponding to the section label 305. Thus, each of the categorized sections 303 provide a listing of associated categorized IDs 132. Proximate to each of the categorized IDs 132 is either an indicator area 307 for specifying that a categorized ID 132 is known or a comment area 308 for entering a note regarding a categorized ID 132. The indicator area 307 may be a check box for placing a checkmark or an "x," and the comment area 308 may be one or more underlines. Also provided in most of the categorized sections 303 are global indicators 309 for specifying that none of the listed IDs in a categorized section 303 are known or are as noted. Each categorized section 303 also provides a general indicator marked "Other" for noting known non-priority IDs, which would not be listed. Comments specifying such generally indicated IDs can be provided on a supplemental disclosure form 350 (FIG. 3B), described below.

FIG. 3B illustrates a secondary disclosure form 350, which is partitioned into a comments section 351, a notices section 353 and a signatures section 355. The comments section 351 provides a lined space 360 for noting specifics regarding a non-priority ID 114 (FIG. 1A) or other condition that is flagged on the primary disclosure form 300 under "Items as noted." The comments section 351 could also be used to provide commentary regarding a flagged priority ID 112 (FIG. 1A). The notices section 353 contains preprinted legal disclaimers 370. The signatures section 355 contains a "conditions accepted" signature block 380 for a party's acknowledgement that they have been given notice of the listed conditions. The signatures section 355 also contains "prepared by" and "supervisor" signature blocks 390 for professional acknowledgement of property inspection and associated research in conjunction with completion of the disclosure forms 300 (FIG. 3A), 350.

Compiling IDs

Figure 4A:
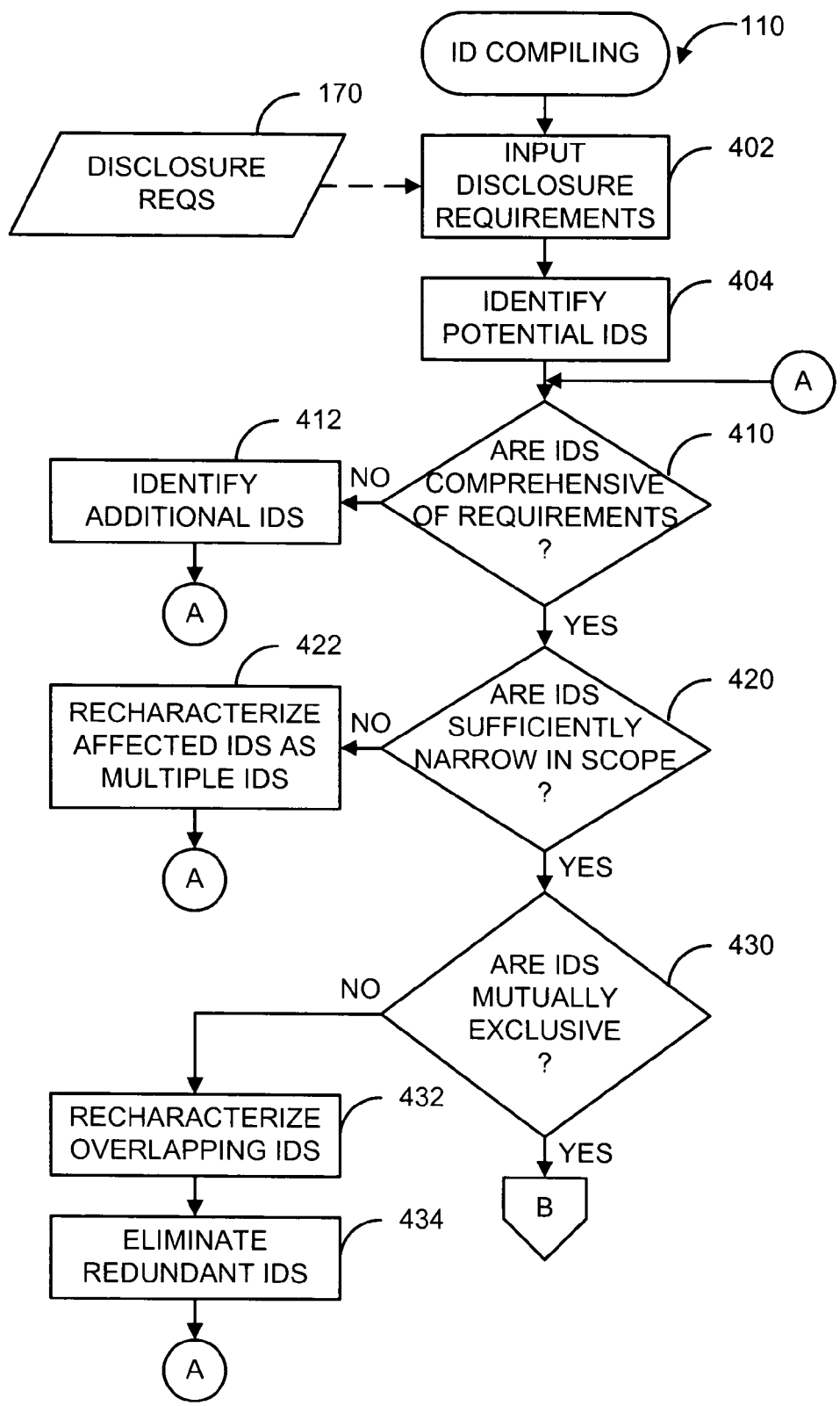
FIGS. 4A-B are a flowchart of the ID (item of disclosure) compiling process.

FIG. 4A illustrates the first part of the ID compiling process 110. Initially, disclosure requirements 170 are input 402. Potential IDs are identified 404, for example using tentative ID labels and descriptions based upon the real estate conditions the IDs disclose. Comprehensiveness is tested 410 to determine if the IDs meet all of the disclosure requirements 170. If not, additional IDs are identified 412 and the IDs are retested 410 to determine if all disclosure requirements 170 are met. If so, ID breadth is tested 420 to determine if the identified IDs are sufficiently narrow in scope to adequately describe a real estate condition to an interested party. If not, then each overly-broad ID is recharacterized 422 as two or more IDs of narrower scope, and comprehensiveness is retested 410. If so, mutual exclusiveness is tested 430 to insure that the IDs are not overlapping or redundant in scope. If any IDs are not mutually exclusive, then overlapping IDs are recharacterized 432, for example using new tentative labels and descriptions as necessary, redundant IDs are eliminated 434, and comprehensiveness is retested 410.

Figure 4B:
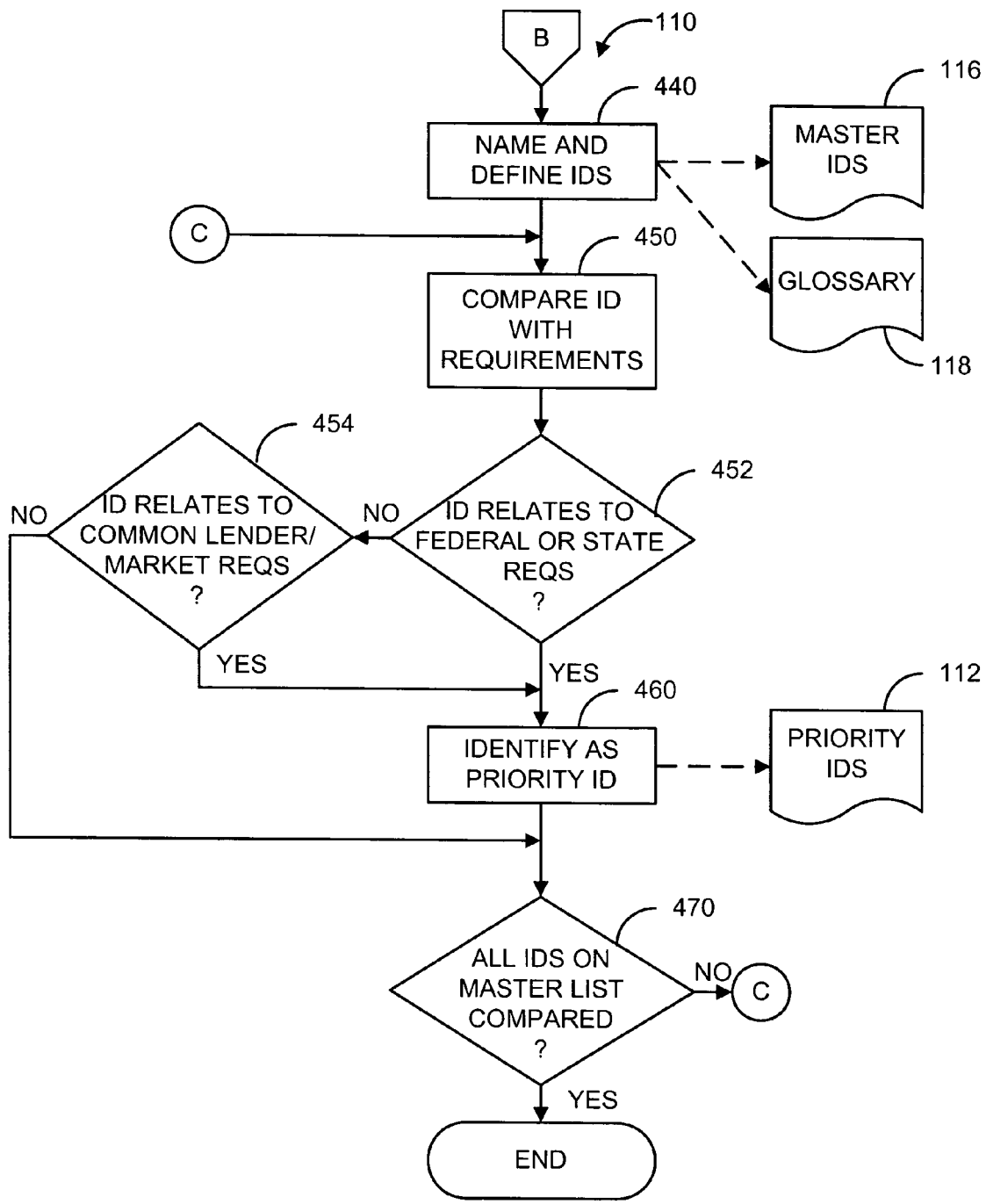

FIG. 4B illustrates the last part of the ID compiling process 110, continuing from FIG. 4A. If the IDs are all mutually exclusive, the IDs are named and defined 440, which generates a compilation or list of master IDs 116 and associated definitions 118. Each of the master IDs 116 is compared 450 with the disclosure requirements 170 (FIG. 4A). If an ID relates to Federal or state requirements 452, the ID is identified as a priority ID 460. If not, it is determined if the ID relates to common lender or market requirements 454. If so, the ID is identified as a priority ID 460, otherwise, it is not. It is then determined 470, if all of the master IDs 116 have been compared with the disclosure requirements 170 (FIG. 4A). If not, a different ID is compared 450 with the disclosure requirements 170 and the above described process continues. Otherwise, the ID compiling process is complete.

Defining Categories

Figure 5A:
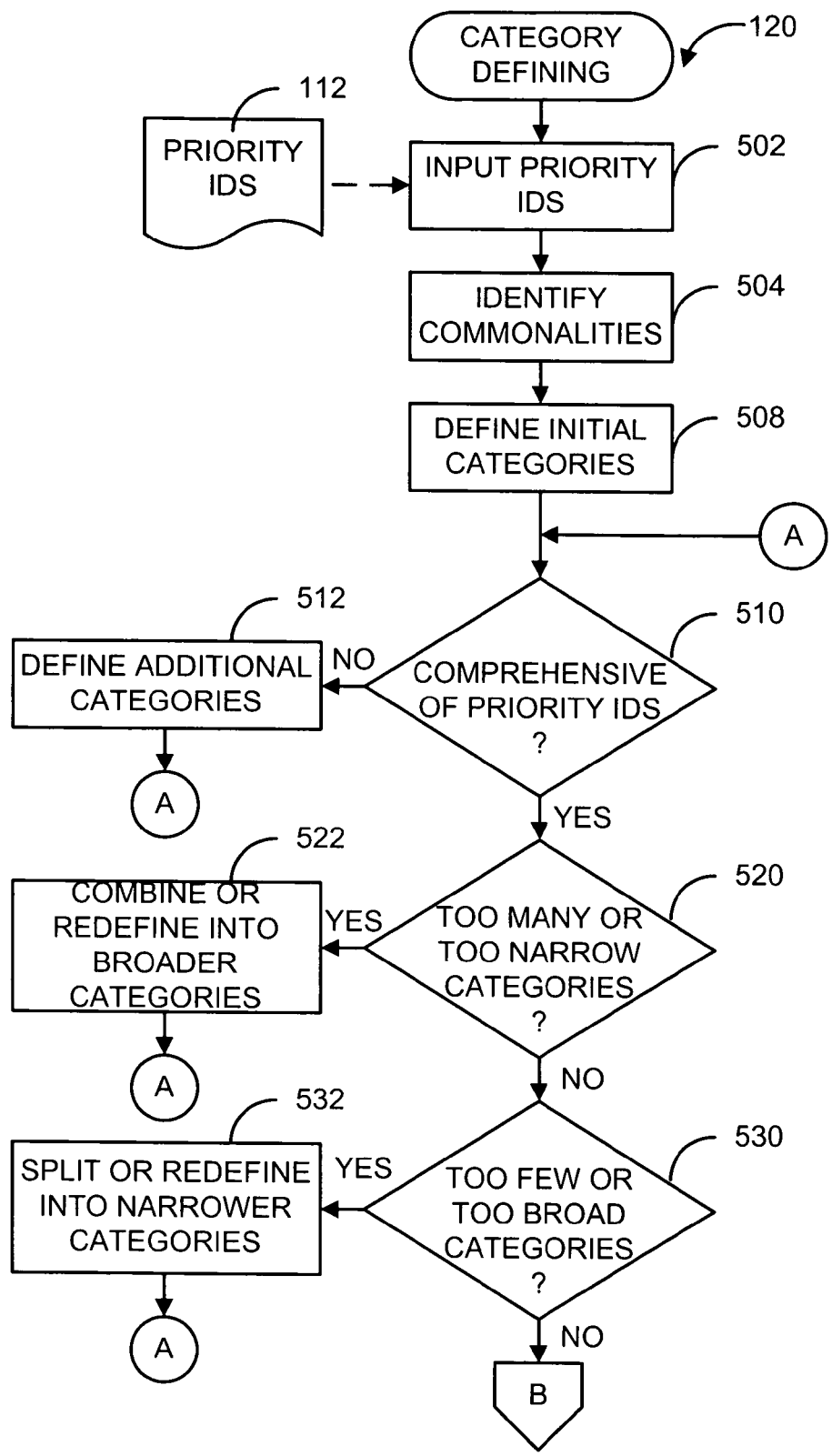
FIGS. 5A-B are a flowchart of the category defining process.

FIG. 5A illustrates the first part of the category defining process 120. Initially, priority IDs are inputted 502 from a compilation or list of priority IDs 112. Commonalities are identified 504 among the priority IDs 112 from a review of priority ID names and definitions. Then, initial categories are defined 508, providing tentative descriptions or descriptive labels, for example. Comprehensiveness is tested 510 to determine if the defined categories have sufficient scope to include or cover all of the priority IDs 112. If not, additional categories are defined 512 and category comprehensiveness is retested 510 to determine if all priority IDs 112 are included or covered. If the defined categories are comprehensive, then breadth is tested 520, 530 to determine if the defined categories are sufficiently broad or narrow in scope to adequately classify the priority IDs into categories. This may require an iteration of the ID classifying process 130, described with respect to FIGS. 6A-B, below. For example, if there are dozens of categories with only a few IDs being classified into each category or if there are only a few categories with many IDs being classified into each category, the resulting forms and the associated research and disclosure processes described herein may be less useful. Broadness is tested 520 to determine if there are too many categories or if the category definitions are too narrow in scope. If so, categories are combined or redefined into broader categories 522 and the comprehensiveness test 510 is repeated. Otherwise, narrowness is tested 530, to determine if there are too few categories or if the category definitions are too broad in scope. If so, categories are split or redefined into narrower categories and the comprehensiveness test 510 is repeated.

Figure 5B:
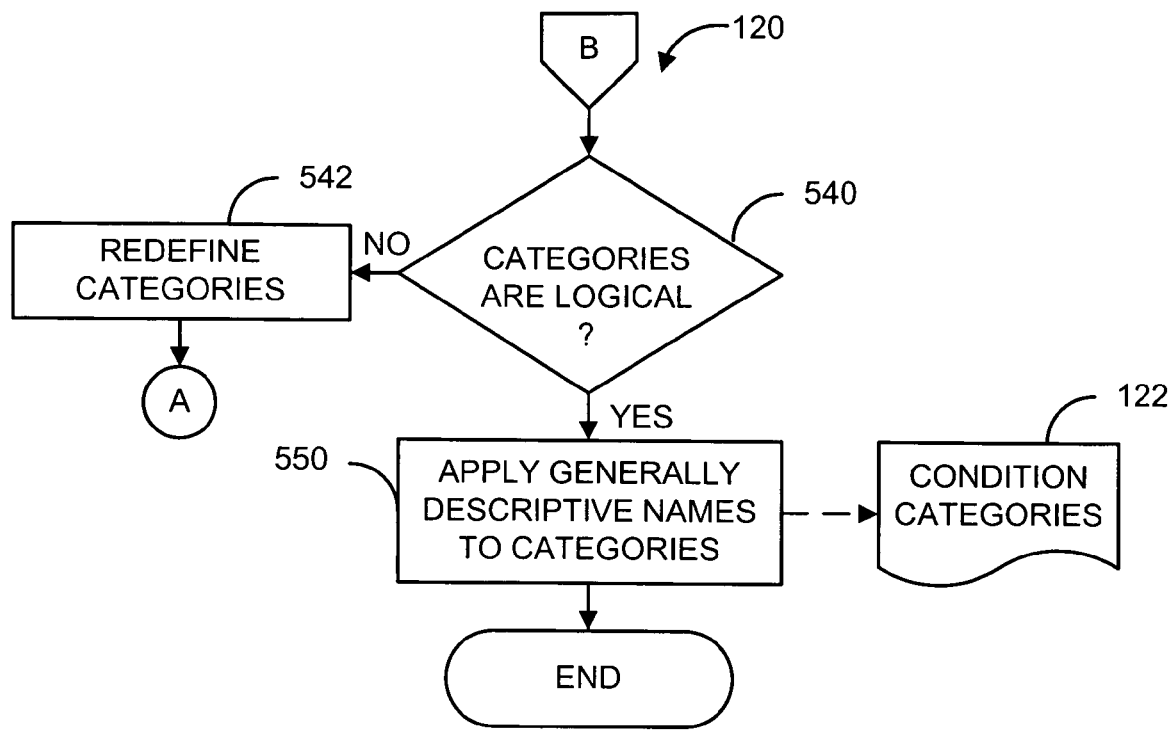

FIG. 5B illustrates the last part of the category defining process 120, continuing from FIG. 5A. After comprehensiveness is tested 510 (FIG. 5A) and breadth is tested 520, 530 (FIG. 5A), category logic is tested 540 to determine if all the priority IDs can be rationally or sensibly associated with the defined categories. This may also require an iteration of the ID classifying process 130, described with respect to FIGS. 6A-B, below. If the defined categories do not allow logical ID classification, the categories are redefined 542 and the comprehensiveness test 510 (FIG. 5A) and breadth tests 520, 530 (FIG. 5A) are repeated. If the defined categories are logical, the categories are given generally descriptive names 550, generating a compilation or list of condition categories 122 to complete the category defining process 120. As noted above, the category defining process 120 may be iterative with the ID classifying process 130, described with respect to FIGS. 6A-B, immediately below.

Classifying IDs

Figure 6A:
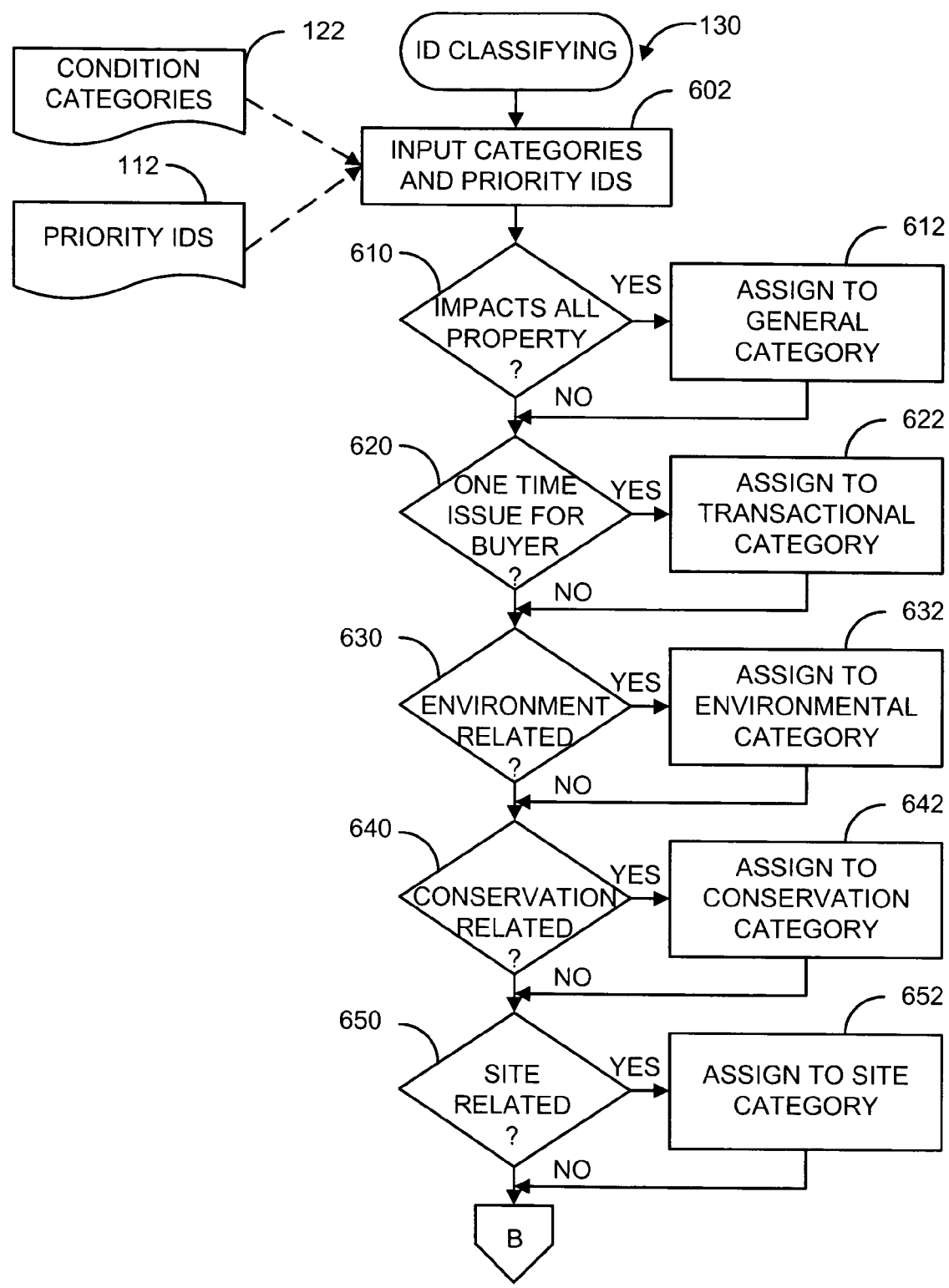
FIGS. 6A-B are a flowchart of the ID classifying process.
Figure 6B:
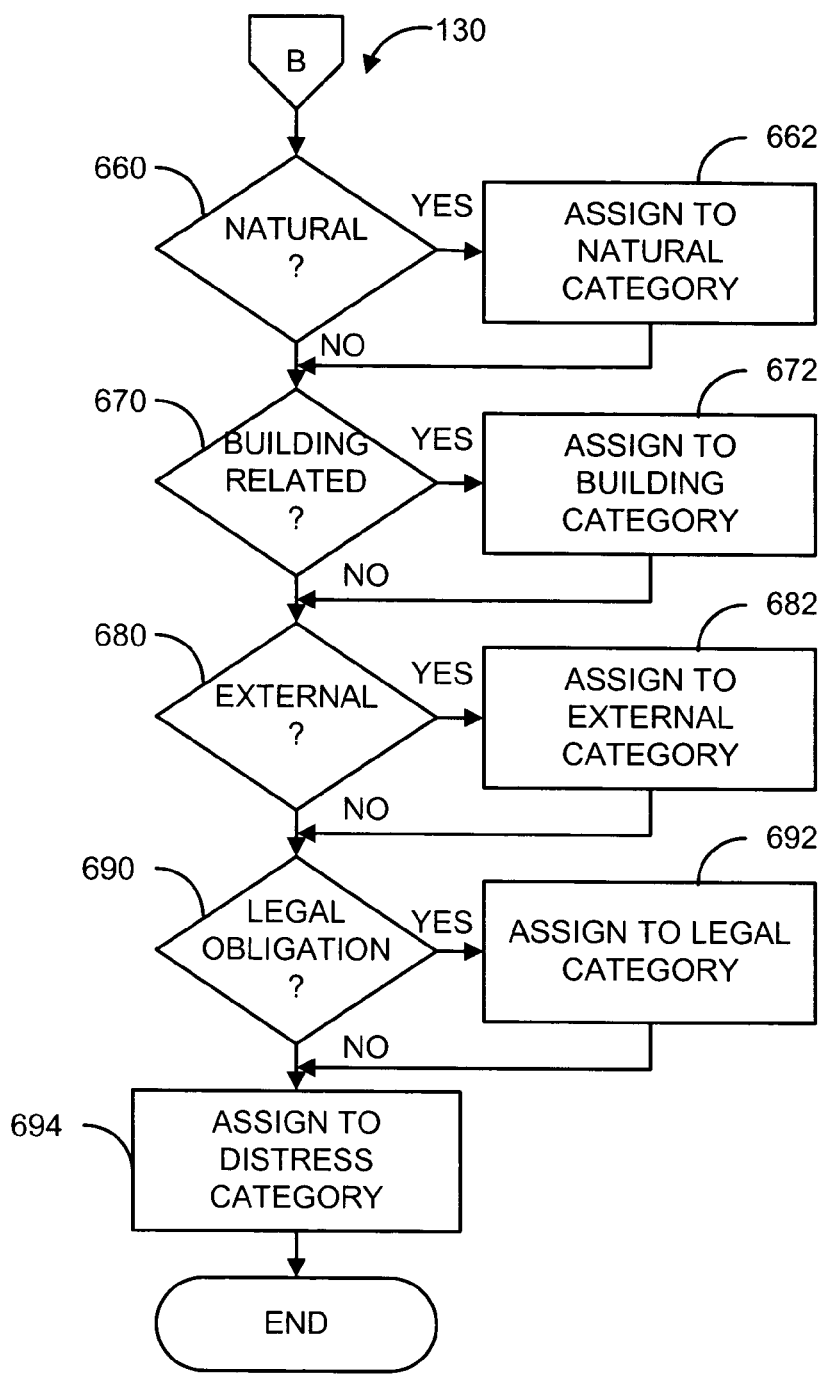

FIGS. 6A-B illustrate an embodiment of the ID classifying process 130 for a particular set of condition categories 122 (FIG. 1A). As shown in FIG. 6A, initially, condition categories and priority IDs are inputted 602 from a compilation or list of priority IDs 112 and a compilation or list of condition categories 122. Then, priority IDs are tested to determine if any impact all property 610. If so, these IDs are assigned to the general category 612. Next, priority IDs are tested to determine if any are a one time issue for a buyer 620. If so, these IDs are assigned to the transactional category 622. Following that, priority IDs are tested to determine if any are environment related 630. If so, these IDs are assigned to the environmental category 632. Next, priority IDs are tested to determine if any are conservation related 640. If so, these IDs are assigned to the conservation category 642. Then, priority IDs are tested to determine if any are related to the site 650. If so, these IDs are assigned to the site category 652.

As shown in FIG. 6B, continuing the ID classifying process 130, priority IDs are tested to determine if any are related to natural conditions 660. If so, these IDs are assigned to the natural category 662. Following that, priority IDs are tested to determine if any are related to building conditions 670. If so, these IDs are assigned to the building category 662. Next, priority IDs are tested to determine if any are related to conditions external to the property 680. If so, these IDs are assigned to the external category 682. Then, priority IDs are tested to determine if any are related to legal obligations 690. If so, these IDs are assigned to the legal category 692. Finally, all remaining, i.e. unclassified priority IDs, are assigned to the distress category 694.

As shown in FIGS. 6A-B, the ID classifying process 130 advantageously assigns the priority IDs 112 to condition categories 122 in a predetermined sequence. In this manner, IDs that can be classified within any of several condition categories are resolved into a single condition category. In the particular embodiment shown, the general category test 610 is performed first, the transactional category test 620 is performed second and so on until assignment to the distress category 694 is performed last by default. As such, an ID that might be classified, for example, as either environmental or external, such as a nuclear plant, would be classified as environmental because the process performs the environmental category test 630 before the external category test 680. That is, assignment of IDs 112 to condition categories 122 is prioritized according to this predetermined sequence.

Creating Forms

Figure 7A:
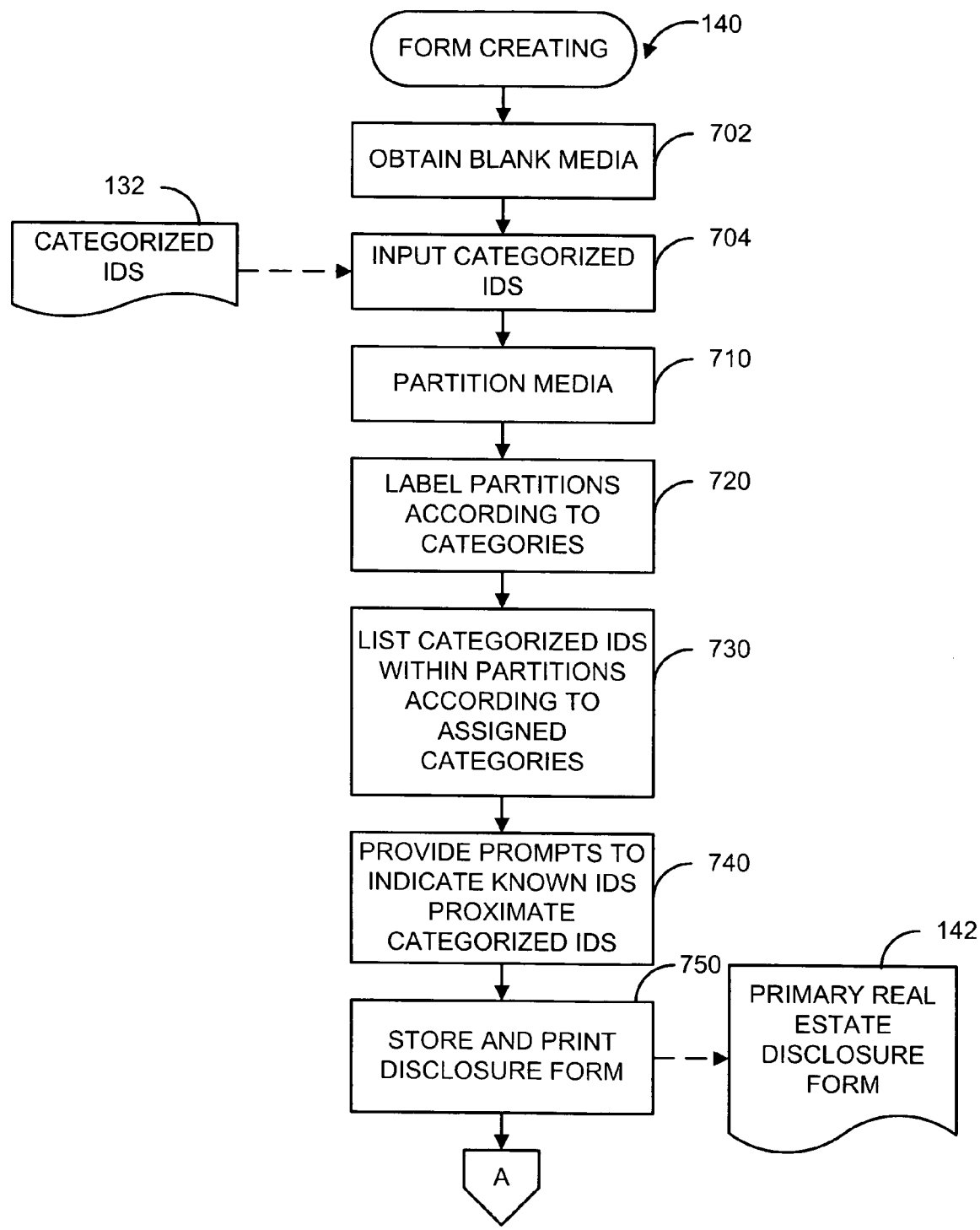
FIGS. 7A-B are a flowchart of the form creating process.
Figure 7B:
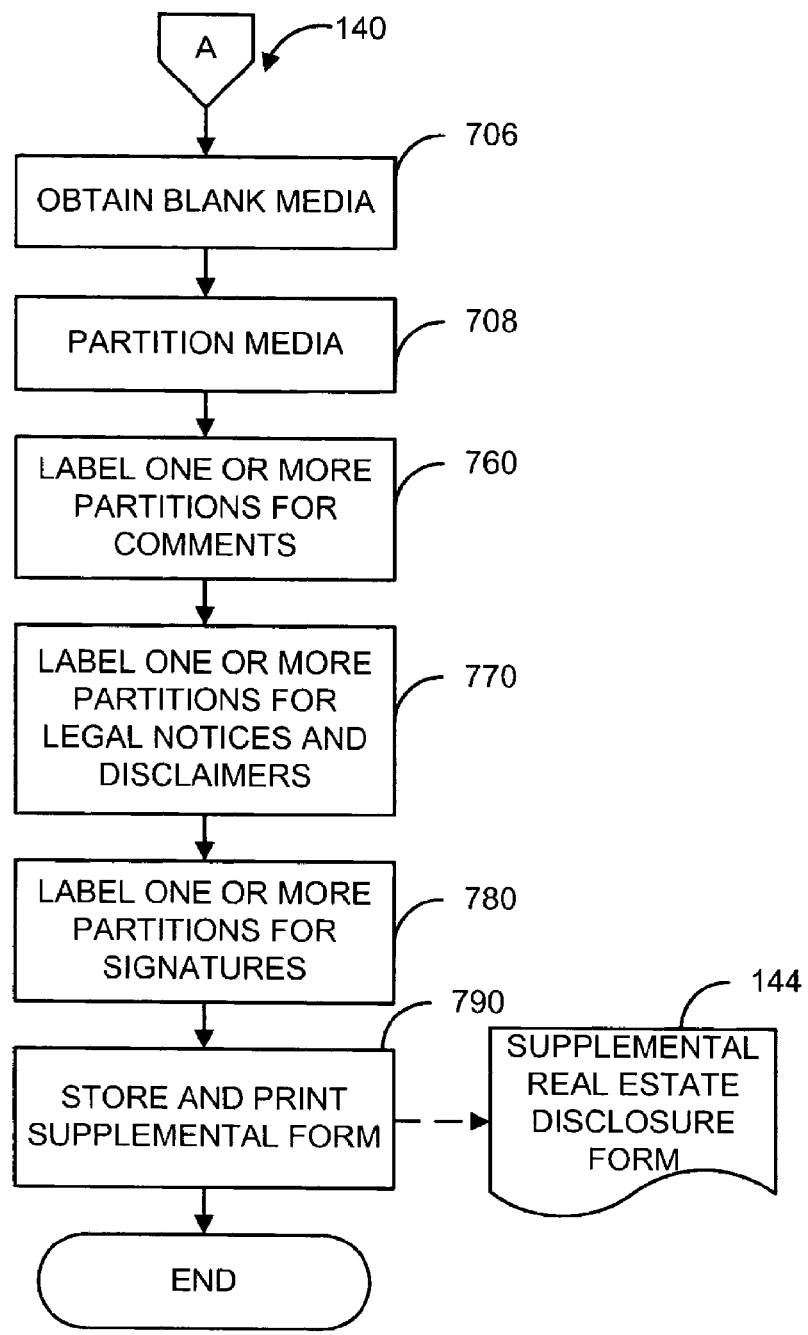

FIGS. 7A-B illustrate the form creating process 140. FIG. 7A illustrates the creation of a primary real estate disclosure form 142, and FIG. 7B illustrates the creation of a supplemental real estate disclosure form 144. As shown in FIG. 7A, blank media is obtained 702, which may be, for example, physical paper, magnetic or other storage media or electronic media, such as a web page formatted with HTML or any other markup language for downloading to a browser over the Internet. In addition, categorized IDs are inputted 704 from a compilation or list of categorized IDs 132. Further, the media is partitioned 710, and the partitions are labeled 720 according to the condition categories corresponding to the categorized IDs 132. Also, the categorized IDs are listed within the partitions according to assigned categories 730. Categories are assigned according to the ID classifying process 130 (FIGS. 6A-B), described above. Prompts are provided proximate the categorized IDs 740. A prompt may be, for example, a blank box for placing an "x" or checkmark to indicate a known ID. Finally, the primary real estate disclosure form is stored and/or printed 750. Copies of the resulting primary disclosure form 142 are then available for the report generating process 160 (FIG. 9), described below and to assist in conducting all or part of the property researching process 150 (FIGS. 8A-C), also described below.

Figure 9:
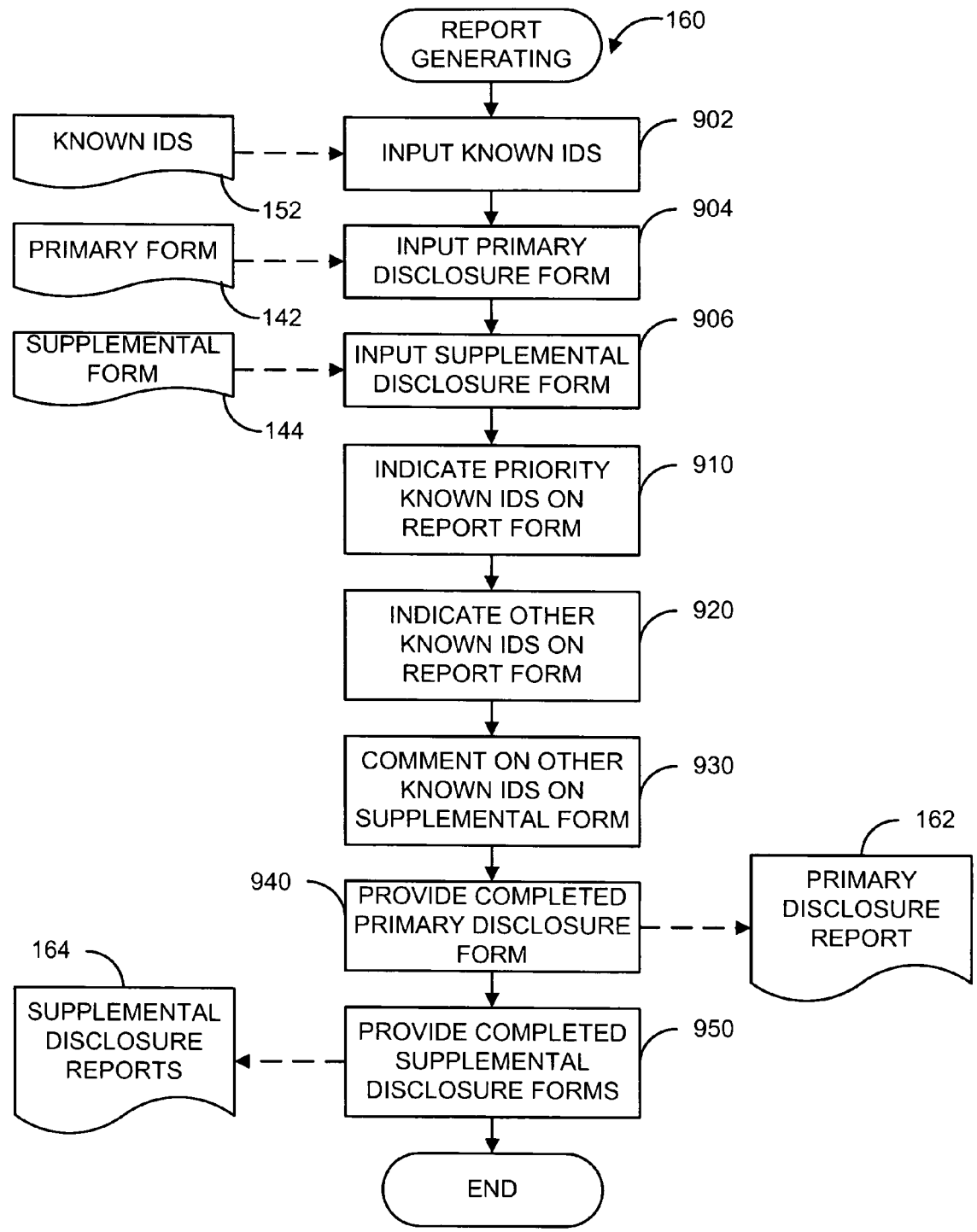
FIG. 9 is a flowchart of the report generating process.

As shown in FIG. 7B, initially blank media is obtained 706, and the media is partitioned 708. As described above, the media may be physical paper, magnetic or other storage media, or electronic media, for example. Further, one or more of the partitions are labeled for comments 760, one or more of the partitions are labeled for legal notices and disclaimers 770, and one or more of the partitions are labeled for signatures 780. Finally, the supplemental real estate disclosure form is stored and/or printed 790. Copies of the resulting supplemental disclosure form 144 are then available for the report generating process 160 (FIG. 9).

Researching Properties

Figure 8A:
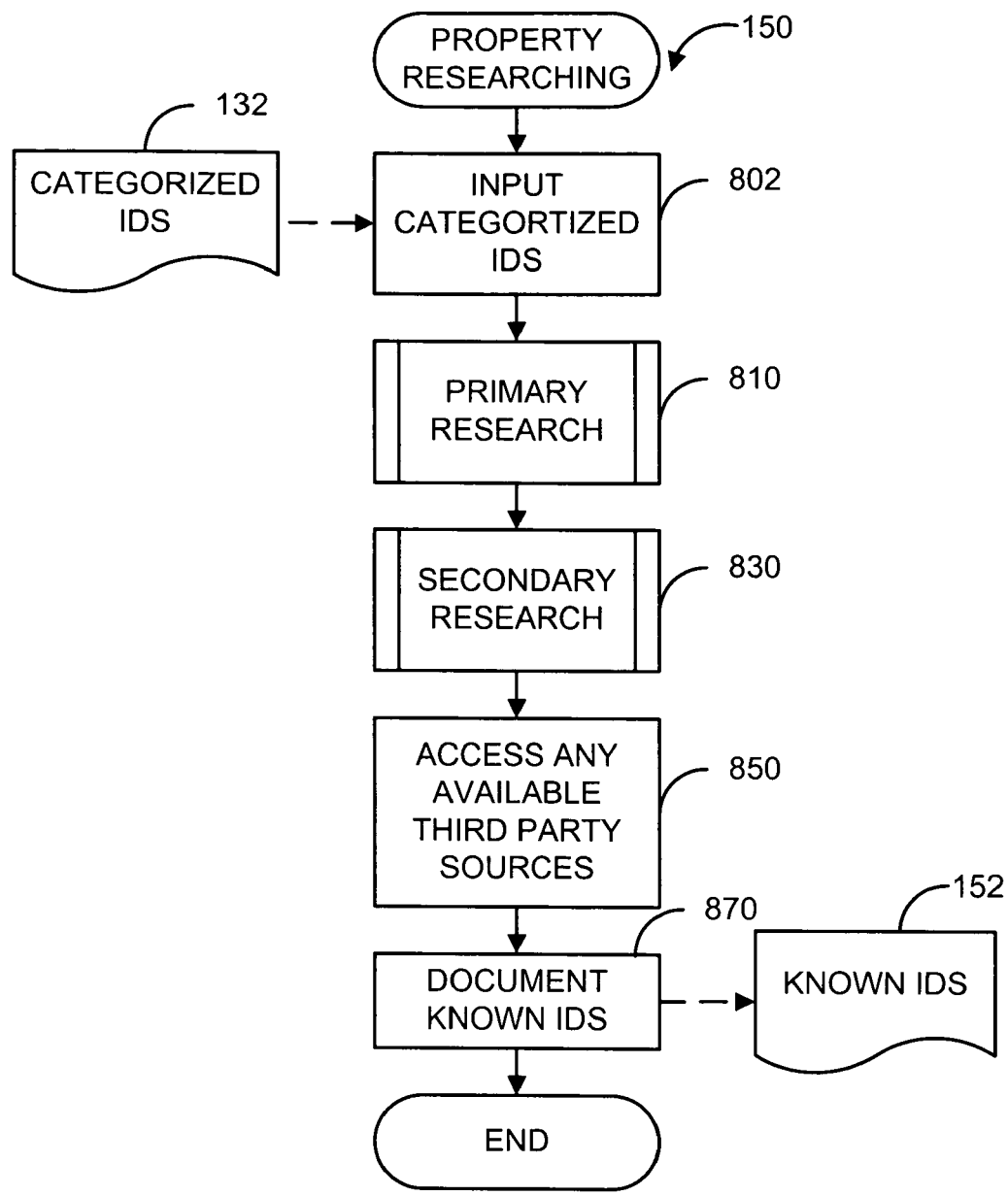
FIGS. 8A-C are a flowchart of the property researching process.
Figure 8B:
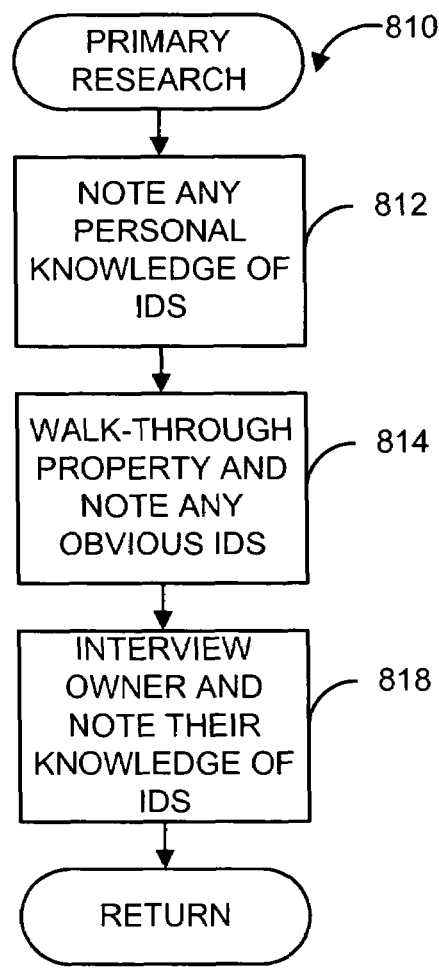
Figure 8C:
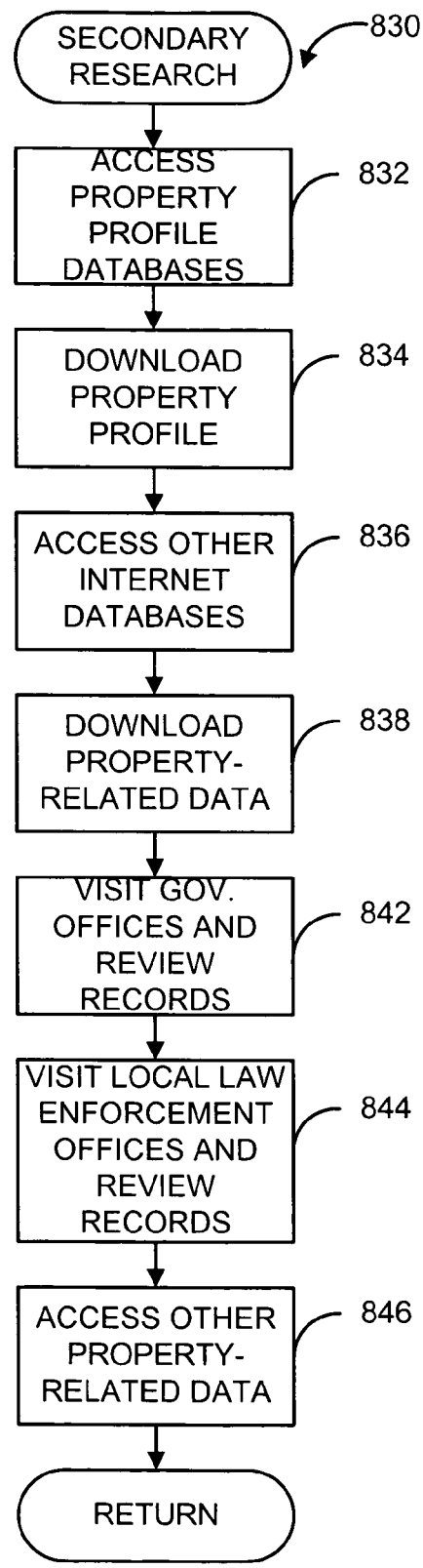

FIGS. 8A-C illustrate the property researching process 150. As shown in FIG. 8A, initially, categorized IDs are inputted 802 from a compilation or list of categorized IDs 132. Primary research is performed 810, described with respect to FIG. 8B, below. Also, secondary research is performed 830, described with respect to FIG. 8C, below. Further, any available third-party sources are accessed 850. Finally, any known IDs are documented 870, as determined from the primary 810, secondary 830 and third-party 850 research, to generate a compilation or list of known IDs 152 and associated comments or notes.

FIG. 8B illustrates the primary research portion 810 of the property researching process 150 (FIG. 8A). The researcher notes any personal knowledge they have of IDs 812. A property walk-through is performed 814, where the researcher notes any obvious IDs. Further, the researcher interviews the property owner and notes the owner's knowledge of any IDs 818.

FIG. 8C illustrates the secondary research portion 830 of the property researching process 150 (FIG. 8A). The researcher accesses property profile databases 832, which may be available over the Internet, and downloads a property profile 834. The researcher also accesses any other databases available over the Internet 836 and downloads any property-related data 838 accordingly. The researcher also visits local, state or Federal government offices 842 to review any property-related records that may be available. Also, the researcher visits local law enforcement offices 844 to review, for example, their records of any property-related incidents. Finally, the researcher accesses any other property-related data 846, such as maps, market studies, homeowner association records and multiple-listing service (MLS) documents.

Generating Reports

FIG. 9 illustrates the report generating process 160. Initially, known IDs are inputted 902. These known IDs 152 are compiled during the property researching process 150 (FIGS. 8A-C) and may include, for example, records and other printed data, notes and recollections of a researcher, and checkmarks or other indications and comments that a researcher has made on the primary and supplemental real estate disclosure forms 142, 144. Also, the primary and supplemental real estate disclosure forms are inputted 904, 906. The primary and supplemental real estate disclosure forms 142, 144 are generated from the form creating process 140 (FIGS. 7A-B), described above. Known priority IDs are indicated on the primary disclosure form 910. Further, known non-priority IDs are generally indicated on the primary disclosure form 920, such as marking "Other," and comments regarding these known non-priority IDs are made on the supplemental disclosure form 930. The completed primary disclosure form the completed supplemental disclosure forms are provided 940, 950 as a primary real estate disclosure report 162 and associated supplemental real estate disclosure reports 164, along with other relevant attachments, e.g. maps. Real estate professionals can then present these generated reports 162, 164 to various interested parties for signature and satisfaction of the requirements, obligations or needs to disclose the condition of a particular property.

Categorized IDs

Figure 10A:
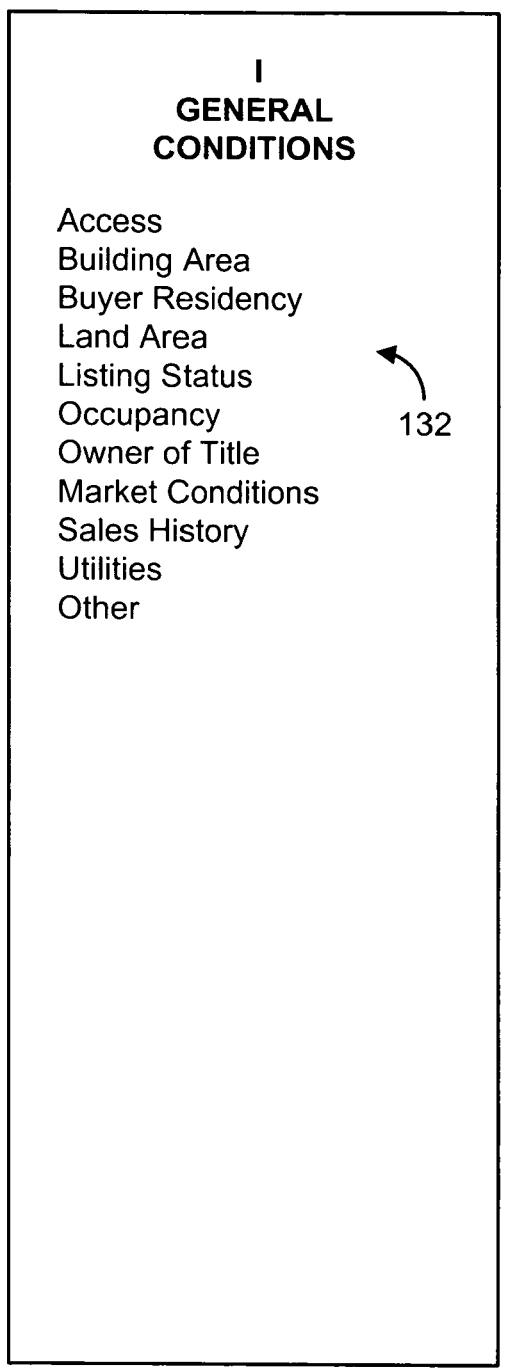
Figure 10J:
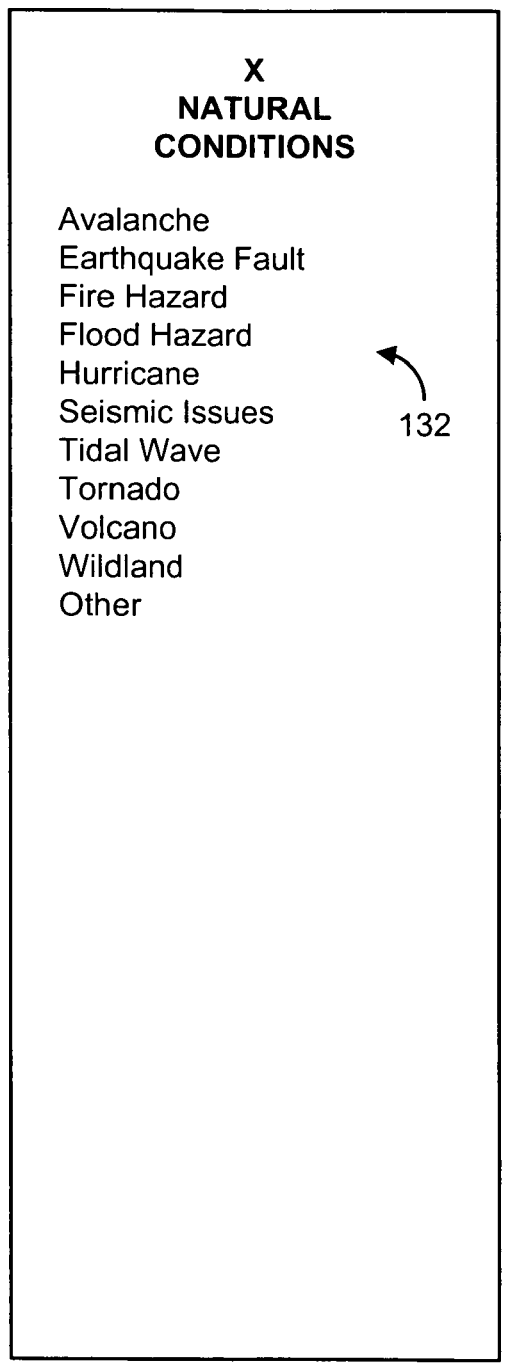

FIGS. 10A-J illustrate categorized IDs 132, described generally with respect to FIG. 1A, above. In one embodiment, ten condition categories 122 (FIG. 1A) are determined. These are (I) general; (II) transactional; (III) distress; (IV) legal; (V) external; (VI) building; (VII) site; (VIII) environmental; (IX) conservation; and (X) natural conditions. The general condition category encompasses conditions that impact all property. FIG. 10A illustrates general categorized IDs 1005. The transactional condition category encompasses one-time issues for a buyer. FIG. 10B illustrates transactional categorized IDs 1015. The distress condition category encompasses any tragedy or perceived future potential tragedy associated with a property. FIG. 10C illustrates distress categorized IDs 1025. The legal condition category encompasses legal obligations on the part of a property owner. FIG. 10D illustrates legal categorized IDs 1035. The external conditions category encompasses "externalities" that may have an influence on a property. FIG. 10E illustrates external categorized IDs 1045. The building condition category encompasses the design, construction or condition of a building or a building's improvements. FIG. 10F illustrates building categorized IDs 1055. The site condition category encompasses the geotechnical condition of a property. FIG. 10G illustrates site categorized IDs 1065. The environmental condition category encompasses actual or potential contamination issues. FIG. 10H illustrates environmental categorized IDs 1075. The conservation condition category encompasses wildlife or habitat issues. FIG. 10I illustrates conservation categorized IDs 1085. Natural conditions encompass any force of nature. FIG. 10J illustrates nature categorized IDs 1095.

Secondary Sources

Figure 11B:
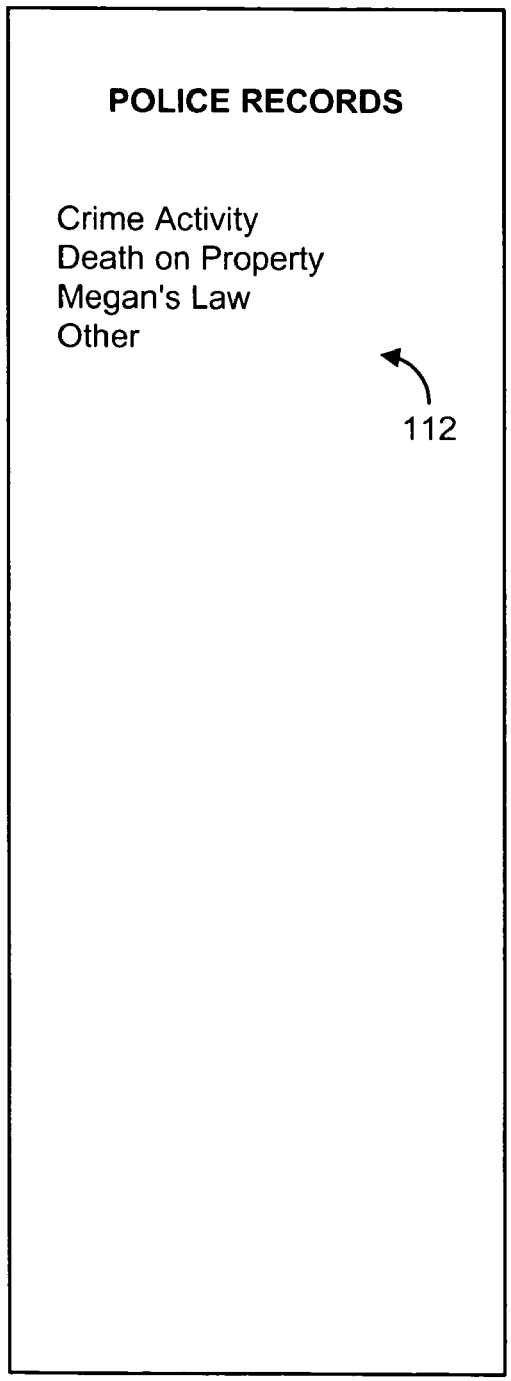
Figure 11C:
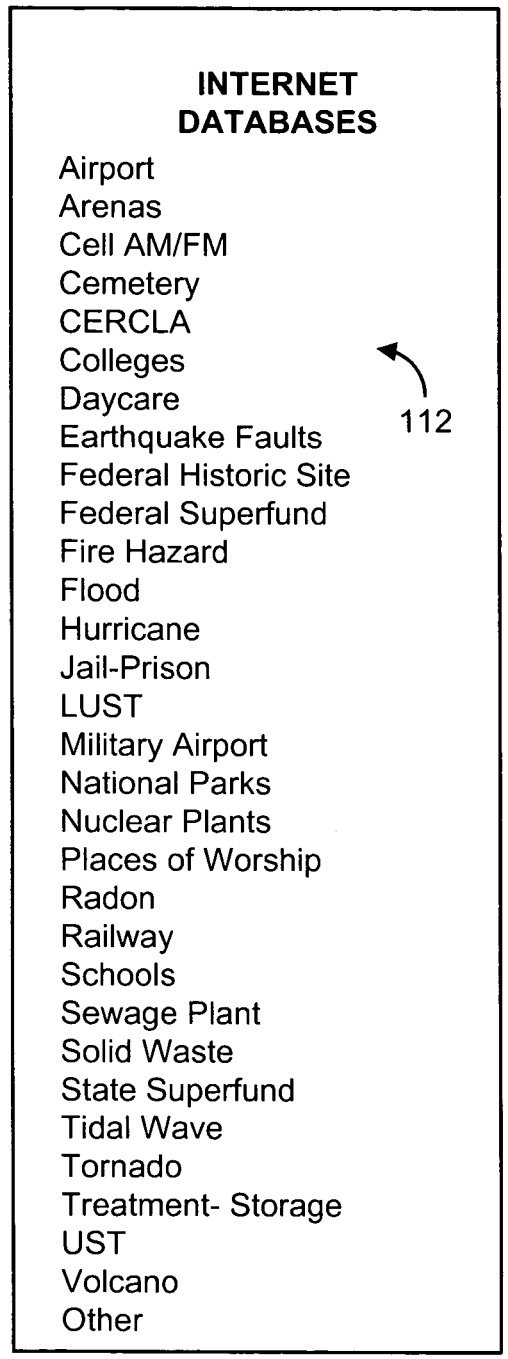
Figure 11D:
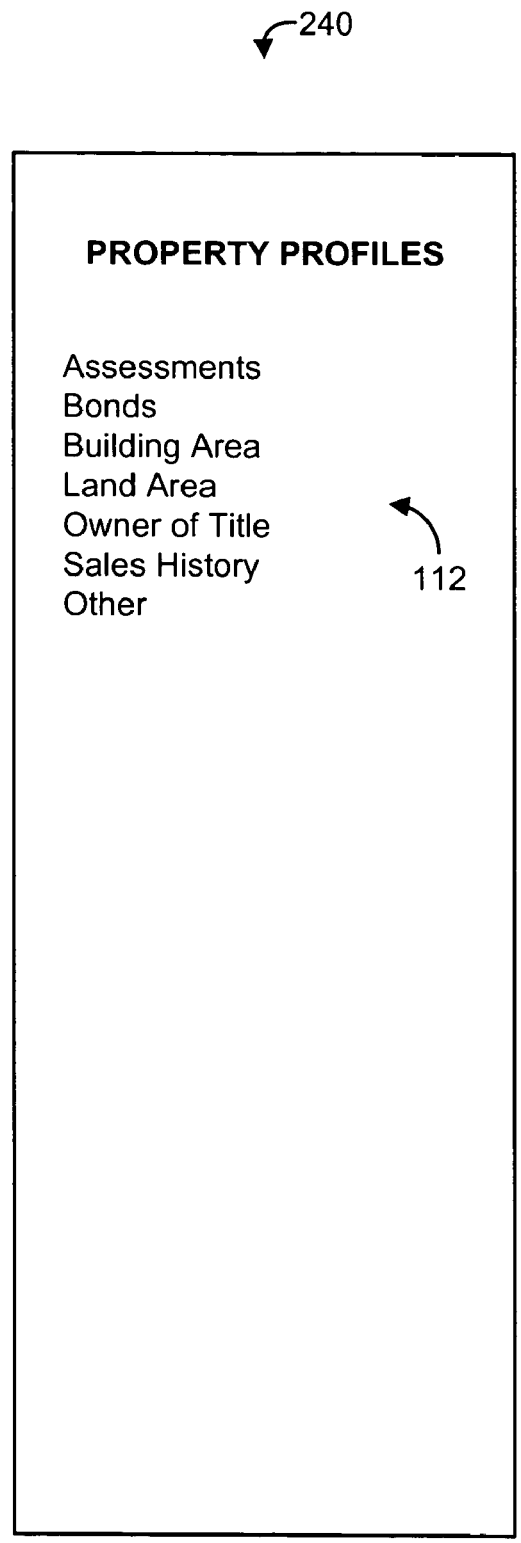

FIGS. 11A-E illustrate IDs 112 that can be researched by accessing secondary research sources 184 (FIG. 1B), which are described with respect to FIGS. 1B and 2, above. In one embodiment, there are five types of secondary information sources 184 (FIG. 1B). These are government records 210, police records 220, Internet databases 230, property profiles 240 and other sources 250. FIG. 11A illustrates those IDs that can be researched by accessing government records 210. FIG. 11B illustrates those IDs that can be researched by accessing police records 220. FIG. 11C illustrates those IDs that can be researched by accessing Internet databases 230. FIG. 11D illustrates those IDs that can be researched by reviewing property profiles 240. FIG. 11E illustrates those IDs that can be researched by accessing other secondary information sources 250.

The real estate disclosure reporting method has been disclosed in detail in connection with various embodiments. These embodiments are disclosed by way of examples only and are not to limit the scope of the claims that follow. One of ordinary skill in the art will appreciate many variations and modifications.

APPENDIX A

Priority ID Glossary

ADA. Americans with Disabilities Act, which places restrictions on the use of buildings that, are used by the public to facilitate easier access by people with disabilities.

airport. Any airport, such as municipal, national, international or military, that creates noise contours over other properties.

arenas. A large stadium for hosting sporting or other events.

arson. The act of deliberately setting fire to a property.

asbestos. Natural mineral mined from rock and used in construction. Properties include noncombustibility, corrosion resistance, high tensile strength, and both thermal and electrical insulating capability.

assemblage. A collection of two or more parcels by one property owner. The buyer may (but not always) pay a premium over the market value because of the buyer's special motivations associated with the buyer's use of the combined parcels.

assessments. An property tax or bond encumbrance.

association dues. The requirements to pay dues to an association that is a legal obligation of the property owner.

auction. The sale of property by sale to the highest bidder.

avalanche. The sudden and swift flow of a mass of ice, snow, soil, rock, or other material down a hillside or mountainside.

bankruptcy. A sale of property due to the financial involvency of it's owner who has filed for bankruptcy protection.

basin. A low-lying area used to collect water or other fluids.

bonds. A loan where the payments are a legal obligation of the property owner.

building area. The square footage of the improvements as defined by various real estate organizations.

build to suit. Improvements that are constructed to the specifications of a specific buyer or tenant.

burglary. A property where there has been a history of robbery or burglary.

CC&Rs. The conditions, convenent and restrictions of a community association.

cell am/fm tower. A communications tower that is used to transmit radio and cell telephone calls.

cemetery. Proximity or view of a cemetery or burial site.

CERCLA. Comprehensive Environmental Response, Compensation, and Liability Act of 1980. Often referred to as the Superfund Act. This are further delineated between active (still in use) and inactive (no longer in use) sites.

college. A university or other campus for high learning.

conservation area. An area designated as being sensitive in terms of its natural resourses.

construction defect. Improvements that have been improperly constructed.

cracking. Any cracking to the floors or other improvements, criminal activity. Any behavior on a property that is illegal.

creek/pond. The existence of a pool of water or small water tributary on a property.

crime scene. A property that has been the scene of criminal activity.

cultural resource. Any site or improvements on a property that have a cultural significance, such as ancient burial grounds.

dam. Proximity to a dam or a dam inundation risk area.

daycare. A registered facility to provide daytime care to preschool age children.

death on property. A property that was the scene of a human death.

deed restriction. A recorded restriction on the use of the property.

double escrow. An escrow to a buyer who immediately transfers the property to a second buyer.

drainage. The sheet water flow and ability of a site to divert and drain excess water.

drug activity. Any illegal drug dealing or use on a property.

earthquake fault. The area along which the ground or subsurface areas move, creating earthquakes.

easement. The non-fee simple estate ownership to utilize a site, or a portion of a site, in some defined manner.

EIFS. Exterior Insulation and Finishing Systems, which are pre-formed stucco-textured sheets.

eminent domain. The taking of property, as allowed under the U.S. Constitution, for the public good and upon payment of just compensation.

encroachment. An improvement that is constructed in such a manner that it crosses the property line or otherwise encroaches upon an adjacent property.

endangered species. A plant or animal that inhabits a property, where it appears on a governmental list because of its venerability to extinction.

entitlements. The development process and corresponding approvals for land development.

estate sale. The sale of property upon the death of it's owner.

expansion. The enlargement of soils due to moisture inundation or another natural event.

FDIC sale. A sale by the Federal Deposit and Insurance Corporation.

Federal historic site. A property that has been designated as a historic site. This designation may restrict the use of the property.

Federal superfund. Sites that have been designated as having particularly large environmental contamination issues.

feng shui. An ancient Asian belief, in part relating to the orientation and planning of a property site and the improvement layout.

fill soil. Soils that are used to fill in low-lying areas.

fire hazard. Areas or zones that are prone to fires.

fire sprinklers. Typically ceiling-mounted water sprinklers that are activated in the event of a fire.

flood. An event where there is an excessive accumulation of water on a property.

ground lease. The rental of a site for a specified period and at specified terms.

habitat area. A property that has been designated as a special conservation area due to it's habitat.

historic site. A property that has been designated as a historic site by a governmental entity.

homicide. A murder that occurred on a property.

hurricane. A violent storm that is capable of destroying real estate improvements.

infestation. An invasion of insects, plants, or animals that disrupts a property's use or value.

insurance claim. A property where an insurance claim has been filed.

jail or prison. Proximity to a jail, prison or other detention facility.

land area. The square footage or acreage of a parcel of land.

landslide. A sudden or creeping movement of earth downslope.

lead-based paint. Paint that has lead added as one of its ingredients. Considered hazardous if ingested.

leakage. An unintended seepage of fluids, such as water or gasoline, that requires repairs or remediation.

lease. A property that is encumbered by a lease.

legal action. A property where there is or has been a legal claim that impacts the property.

legal non-conforming. A property that was legally constructed but where the zoning or other use restrictions have subsequently changed and would not allow the current improvement to be built if the current structure was removed or destroyed.

liquefaction. The amalgamation or settlement of soils, such as resulting from a seismic event.

loans. Funds that have been borrowed where a property is used to secure the debt.

LUST. Leaking underground storage tank.

Megan's Law. A federal law that requires states to facilitate the disclosure of the location of convicted sexual molesters.

metals. A classification of possible contaminants such as mercury or lead.

military airport. Proximity to a military base with an airport.

molds. A growth of fungus or other molds on a property, typically in cold or damp areas.

moratorium. A stop or restriction of development.

movement. The movement or shifting of soils.

national parks. A open recreational area that has been designated for park use by federal authorities.

natural resources. Amenities or attributes of a property that naturally occur, such as trees, wildlife, etc.

nonconforming use. Improvements that are not in line with surrounding uses, such as a jail in the middle of a residential neighborhood.

non-permit. Building or grading that was completed without a building permit.

nuclear plants. Proximity to a nuclear-powered electric generating facility.

occupancy. The occupants of a property, such as owner-occupied, tenant, vacant, etc.

odors. Any foul or unusual odors that can be detected.

options. The right to purchase or lease a property.

owner of title. The property owner, according to the title documents or deeds.

pesticide. A substance that controls agricultural pests, such as demeton, guthion, malathion, mirex, methoxychlor, and parathion.

places of worship. Churches, synagogues, temples or other houses of worship.

ponding. The puddling of water on a site or its improvements due to improper water sheet flow.

power lines. Electrical power lines or power line corridors that may emit Electro-magnetic fields.

probate. The sale of real estate during the probate period following the owner's death.

radioactive. Having unstable atoms that decay or break down to another kind of atom. The process emits high-energy particles. For example, radium decays to form radon. Radiation includes high-energy particles, which include alpha and beta particles and gamma rays.

radon. A colorless and odorless gas that is emitted from decaying uranium deposits. The gas may enter improvements through cracks and create a health hazard if inhaled.

railway. The right for the construction, maintenance, and operation of a train on a property.

REO Sale. The sale of foreclosed real estate by the lender.

repairs needed. Any deferred maintenance or repairs that are required but uncompleted on a property.

right of refusal. The proprietary right to be offered a property for sale or lease before it can be another offer can be accepted.

sales history. The previous sales date and price of a property, if available.

sale-leaseback. A transaction where the property owner sells the property and immediately leases back the same property.

schools. Elementary, middle or high schools.

septic tanks. An on-site system or cesspool to process wastes.

settlement. The sinking of soils, such as those that have not been adequately compacted.

sewage plant. Proximity to a sewage treatment facility.

shoreland. A site that is located by a body of water.

short sale. The sale of a property where the proceeds come short of the outstanding loan balance.

sinkhole. An opening in the earth created by either natural or man-made subterranean activities. For example, if a tunnel fails, it may create a sinkhole.

slide. The sliding or slippage of soils.

slope creep. A natural landslide that occurs at a very slow rate.

soil contamination. The introduction of a hazardous material into the ground.

soils subsidence. Soils that are unstable and sink.

solid waste. Proximity to a facility that treats non-liquid trash or other disposed materials.

special motivation. A motivation that is unique to a specific buyer, tenant or owner.

state superfund. A property that has been placed on a specific state list of environmentally contaminated properties.

suicide. A property where there has been a suicide on the premises.

tenant purchase. A transaction where the tenant purchases the property that they are leasing.

termites. A small insect that feeds on wood. An infestation of termites can damage or destroy a wood-frame structure.

title issue. Any concern or dispute over the ownership or title of a property.

tornado. A violent storm where various natural forces cause a strong circular wind that can reach over 300 miles per hour. Like some natural disasters, they are unpredictable and unpreventable, and they cause indiscriminate damage, so they tend to not cause a diminution in value to a particular property or neighborhood but rather impact a large region.

tower fall zone. The area that may be impacted in the event of a tower falling.

traffic noise. A property that is impacted by the noise generated by street or freeway traffic.

transactional conditions. Any one-time special motivations of the buyer, tenant or seller.

treatment-storage. A facility that stores or treats environmentally contaminated materials.

tidal wave. A large wave usually caused by an earthquake or an underwater landslide. While unpredictable and unpreventable, they tend to impact certain zones or areas.

tunneling. Drilling or trenching for the placement of underground passages for utility lines, subways, trains, roads, or other uses. Tunnels can cause a diminution in value if the market perceives that they may not be structurally sound or may fail in the event of a seismic event, such as an earthquake.

U.S. Marshall Sale. A sale by court order by the U.S. Marshall office.

UST Underground storage tank.

volcano. A mountain that historically has erupted, or can erupt in the future, and can cause landslides or other destruction. Like some natural disasters, they are unpredictable, unpreventable, and cause indiscriminate damage, so they tend to not cause a diminution in value to a particular property or neighborhood but rather impact a large region.

water contamination. The introduction of hazardous materials into the water or ground water.

watershed. The drainage or collection of water on a site.

wetlands. Areas that are inundated or saturated by surface or groundwater, such as lakes, swamps, marshes, bogs, sloughs, quagmire, wet meadows, river overflows, mud flats, lagoons, and ponds.

zoning. The constitution right of government to restrict the use of a property through regulations.

APPENDIX B

Non-Priority ID Glossary abatement. Removal or the controlled release of contaminants. Includes operations and maintenance (O&M), encapsulation, enclosure, and removal.

above-ground release. Any release of gasoline or other contaminants to the surface of the land or surface water, such as from the above-ground portion of a UST system or overfills.

above-ground tank. A storage reservoir device that is situated above grade so that the entire surface area, including the bottom, can be visually inspected.

ACM. Asbestos containing material.

aeration. The introduction of oxygen into a contaminated liquid, which creates gases that are then released.

air and light diminution. The loss of natural sunlight or air space due to the construction of improvements.

air sample clearance test. Air monitoring at the completion of a contamination abatement or remediation project.

air stripping. An in situ groundwater remediation process. Contaminated groundwater is pumped to the surface and processed in an air stripping tower. The water flows over packing materials. The contaminated water comes in contact with air and the contaminants mix with the air. The contaminated air is released or filtered.

amended water. Mixture of water and surfactant.

aquatic flora. Any plant life associated with the aquatic ecosystem, such as algae, seaweed, etc.

aquifer. A subterranean geological formation that is capable of supplying a significant amount of water to a well or spring.

below-ground release. Any release of contaminants to the subsurface or the groundwater, such as from an underground storage tank.

benign condition. Any condition that occurs but has no impact on the real estate associated with the event.

benzene. A fuel additive that is 2% to 4% of gasoline; a known carcinogen.

blast zone. The area impacted by the explosion of a bomb, volcano, or other situation.

blight. A disease or injury of plants resulting in withering, cessation of growth, and death of parts without rotting. Also, a term to describe older neighborhoods with high crime rates.

blowdown. The discharge of recirculating water for the purpose of discharging materials within the system. This eliminates the buildup of materials that could cause damages.

brackish marsh. A marsh, bog, or swamp that receives an influx of both salt and fresh water.

brownfield. A large site that has been contaminated from operations on the site. Upon remediation, it may be referred to as a greenfield.

BTEX. Benzene, toluene, ethylbenzene, and xylene-primary toxins of soils and groundwater associated with petroleum products.

carcinogen. A cancer-causing substance.

casing. A pipe or tubing lowered into a borehole in order to support the sides of the hole, or to prevent water or gas from entering or exiting the hole.

catastrophic collapse. The disastrous, sudden, and utter failure of support structures or soils.

cementing. The injection of cement slurry into a drilled hole or behind the casing.

condemnation. The right, as stated within the U.S. Constitution, of the government to take property for the public good and upon the payment of just compensation to the property owner.

confining bed. A mass of impermeable or less permeable material stratigraphically adjacent to an aquifer.

confining zone. A geological formation that limits the movement of water or other fluids.

connection with identified uses. The association of a property with contaminants or prior uses that lead to contamination.

contaminant. Any physical, chemical, biological, or radiological substance in the soil, water, or air.

contamination. The polluting of air, soils, improvements, or groundwater by the introduction of a hazardous substance into the environment.

continuous discharge. An emission that occurs without interruption except for maintenance or other infrequent activity.

contraction. Expansion of soils.

corrosion inhibitor. A substance that is designed to form a protective film against rust or other corrosion.

cost issues. All costs related to the assessment, repair, and ongoing stages of a detrimental condition analysis.

covenant. A promise to use or not use a property in a specific way.

current or past uses in the surrounding area. The external obsolescence created by a historical or ongoing undesirable use nearby.

current use(s) of the property. The operations or applications to which a property is being put.

current uses of adjoining properties. The operations or applications to which contiguous properties are being put.

cut and fill. The removal (cut) of soil or the addition (fill) of soil.

daily discharge. The emission or discharge, in terms of mass, of a pollutant in a 24-hour period.

debris compost. The decay of debris and the resulting soils subsidence it causes.

deed. A document that records a loan that is secured with the property.

deferred maintenance. Routine property upkeep that has been neglected.

degraded wetlands. Swamps, bogs, marshes, etc., that have been negatively altered by man.

deluge. A sudden flooding or inundation of water.

diatomaceous earth filtration. A water filtering process whereby a coat or "cake" of diatomaceous earth filter media is deposited over a membrane (septum) and water is passed through.

differential settlement. Soils with differing compaction or materials that settle to unequal levels.

diminution in value. The lost value of real estate before (as if impaired) and after (or upon discovery of) a detrimental condition.

direct condemnation. The physical taking of property through the process of eminent domain.

discharge. The spillage, leakage, pouring, emitting, or dumping of hazardous materials into land, air, or water.

disinfectant. Any oxidant, such as chlorine, used to kill microorganisms.

disintermediation. A period when long-term interest rates are lower than short-term interest rates.

disposal. The discharge, deposit, injection, dumping, spilling, leaking, or placing of any solid waste or hazardous waste into the air, water, ground, or groundwater.

disposal system. A system of man-made or natural barriers that isolate spent nuclear fuel or radioactive waste or other contaminants.

distillation. A water purification technique that purifies water by heating the water and condensing the steam. The process reduces salt concentration but is ineffective in removing pesticides and volatile organic contaminants such as benzene or chloroform.

drought. The prolonged lack of rain or availability of an adequate water supply.

earthquake retrofit. Additional structural support added to the improvements to provide the support necessary to withstand earthquake destruction or to bring the property into conformity with current earthquake building regulations.

economic depreciation. A decline in the economy that negatively impacts real estate values.

economic disaster. A large-scale event that negatively impacts the overall economy, which in turn impact real estate values.

economic obsolescence. The loss incurred when the depreciated value of the improvements, from a cost perspective, is more than the market value.

effluent. Treated liquid waste.

egress diminution. The partial or total loss of the ability to exit or leave a site.

electromagnetic fields (EMFs). The electric forces emitted by power lines or other electrical devices.

encapsulant. Liquid substances that are applied to contaminants to prevent their escape. Bridging encapsulants form a coating over the contaminant's surface. Penetrating encapsulants soak into the contaminants to bind its components together. Both types are frequently used together.

encapsulation. A contamination remediation process that encapsulates the contaminants to prevent leaching and surface seepage of contamination into either the air, groundwater, or storm drainage system.

enclosure. Construction of an air or watertight structure that surrounds the contaminant.

end removal. The removal of contaminants when the property is eventually demolished.

environmental impact report. A study required by governmental agencies to determine the impact that a proposed development will have on the surrounding areas.

environmental lien. A restriction placed on a property for environmental reasons.

environmentally sensitive area. An area where the plant or animal life or their habitat are either rare or particularly vulnerable.

equipment decontamination enclosure system. A washroom, holding area, and uncontaminated area for handling materials and equipment.

ex situ. A remediation process that involves excavation.

expansive soil. Soils that expand when moist.

exposure. Contact with a contaminant through skin absorption, inhalation, or ingestion.

external depreciation. Any event or development located off-site that negatively impacts the subject property.

external obsolescence. See external depreciation.

feasibility. The capability of a project or development to be accomplished in a successful manner within a reasonable time.

filtration. Water purification by screening out contaminants using a sediment process, a filter, or a sieve.

flash floods. Sudden-moving flood waters that are generally caused by heavy rains over soils that are not capable of absorbing the moisture.

floodplain. The lowland and flat areas adjoining rivers, canyons, lakes, and ocean waters that are prone to flooding.

formaldehyde. A liquid that is used to preserve woods and other materials and sometimes used in construction processes.

fresh water marshes. Marshes where the water has concentrations of salt less than five parts per 1,000.

friable. Building materials, such as asbestos, that may be crumbled by hand pressure.

functional depreciation. See functional obsolescence.

functional obsolescence. All losses to a property's value except for external influences and physical depreciation—e.g., an outdated and undesirable floor plan or design.

general plan. A proposed outline for the overall development of a city or other municipality that is written and issued by that municipality. Also known as a master plan.

generator. A site where the hazardous waste is produced.

gentrification economics. Improvement and fixing-up of older neighborhoods.

geotechnical issues. Matters relating to soils or soils engineering.

government incentives. A city's or other governmental entity's enticement to develop or use a property in a particular manner, which may alter the highest and best use of the property.

government mandates. A city's or other governmental entity's decree or order to develop or use a property in a specific manner.

grading. Earth moving for the purposes of property development.

groundwater. Water below the land surface or subsurface soils that are saturated with water.

groundwater contamination. The introduction of hazardous or toxic material into the underground water supply or aquifers.

groundwater seepage. Saturated soils that flow up to the surface.

hazardous materials. A material that is determined by qualified engineers to be poisonous, reactive, flammable, corrosive, toxic, or that has been designed as such by a governmental or regulatory agency.

heavy metal. Uranium, plutonium, or thorium placed in a nuclear reactor.

HEPA. High-efficiency particulate air—e.g., HEPA filter or HEPA vacuum—that filters asbestos fibers.

hydric soils. Soils that are saturated with water at or near the surface and are oxygen-deficient long enough to disrupt the growing season.

hydrophytic plants. Plants that grow in or near water, in wet habitats, or in hydric soils.

illegal use. Improvements that have been constructed without the proper building permits.

impaired value. The indicated value of a property upon the application of one or more of the three detrimental conditions to value.

imposed condition. An act or forced event that affects value. Includes long-term and permanent external depreciation.

in-ground tank. A storage device where any portion is located below grade, thereby preventing a visual inspection of the external bottom surface.

in situ. In place, referring to an on-site remediation process without excavation.

incurable condition. A detrimental condition that cannot be economically or physically remedied.

indoor air quality problem. A mechanical issue or construction defect that results in inadequate air circulation, or a use within a property that results in a nuisance or health risk to its occupants.

ingress diminution. The entire or partial loss of the ability to enter or access a site.

initial removal. The up-front and immediate removal of contaminants.

inner liner. A protective layer of material placed inside a tank or container that helps prevent corrosion.

inverse condemnation. The damages caused by an external issue or use that does not physically impact the property.

kangaroo rat. A rodent that has been designated as endangered by some governmental agencies and thereby may create development constraints.

land contract. A contract to transfer property upon the payment of the terms of a contract.

land disposal. The placement of waste or contaminants on the land, such as a landfill, surface impoundment, waste pile, injection well, land treatment facility, salt dome or salt bed formation, underground mine, cave, bunker, or vault.

landfill. A site that is used for trash disposal. May cause environmental problems or neighborhood nuisances.

leach. To dissolve contaminants by percolating liquid in order to separate the soluble components.

leachate. A liquid, such as suspended compounds in liquid, that has percolated through or drained from hazardous materials.

lead. A chemical element that is considered environmentally hazardous in some situation where it may be ingested.

leased fee. The interests of the landlord. The rate specified in the lease may differ from the market over time.

lease option. A provision within the lease to extend the lease, generally at the tenant's option, at a specified rate and for a specified term.

leasehold. The interests of the tenant. The terms of the lease may differ from the market over time.

levees. Embankments to protect flooding along rivers or other bodies of water.

lithology. The description of rocks, based on their physical and chemical characteristics.

lithosphere. The solid part of the earth below the surface, including any groundwater.

littoral zone. The area between the low tide water mark and the high tide water mark.

loading capacity. The maximum level of contaminant discharge that water can receive without violating water quality standards.

Malibu effect. A slang term used to describe the resilience of many waterfront property values when repeatedly damaged by natural forces.

market resistance. The risk, if any, associated with the ongoing stage of a detrimental condition analysis; includes the reluctance on the part of the real estate market to buy a property that has historically been damaged or tainted. Sometimes called stigma.

matrix. Hard, non-friable material (e.g., concrete) that contains asbestos.

maximum contaminant level (MCL). The maximum level of contaminant discharge without violating regulatory standards, usually mandated by state requirements and referencing maximum levels of toxins in drinking water.

monitoring facility. Equipment installed to monitor groundwater below or near an encapsulated site. Used to test if seepage or leaching is occurring on an encapsulated site.

monsoon. A violent storm with the characteristics of heavy rains and strong winds.

mortgage. Debt financing where the property is used as collateral.

MRI release. The escape of magnetic fields from a medical diagnostics device.

MTBE. Methyl tertiary butyl ether, a gasoline additive.

nature preserve. An area designated by governmental agencies to remain in its natural condition, thereby preventing or restricting its development.

neighborhood blight. Urban decay within a community. May be an imposed condition that is ongoing or may be cured and considered a temporary condition.

neighborhood nuisance. Any annoying or irritating external condition or influence. May be permanent or temporary.

no discharge of free oil. A discharge that does not cause a film, sheen, or discoloration on the surface of the water or cause a sludge or emulsion beneath the water surface.

non-market motivation. Any special influence whereby a buyer, seller, or tenant acts in a way that is not typical for the market. For example, a property owner who is in financial distress may sell the property for less that what he or she would have received under normal circumstances.

non-source property. A property that is contaminated, although the discharge of the contaminant occurred on another property—i.e., not the responsible party.

normal property value. The market value of a property in an undamaged condition and without consideration of any detrimental condition.

NPPL. National Priority Pollutants List, a list of common pollutants caused by underground storage tank facilities.

obstruction. The placement of an improvement in such a manner that it interferes with the normal use of a property. A tree planted in front of a gate would be considered an obstruction.

oil-fuel tanks. Any tanks, both subterranean or above-grade, used for the storage of any oil or fuel.

oil seepage. The leakage of oil, possibly from natural underground deposits or from leaking containers or plumbing.

oil spill. The accidental release of oil, often crude oil, into the environment.

ongoing stage. The third stage in a detrimental condition analysis. It includes all costs associated with a damaged property after all repairs or remediation have been completed—e.g., additional financing or insurance costs, use, and market resistance.

operations and maintenance (O&M). An ongoing maintenance program for contaminated properties. For example, for asbestos it could include training, HEPA vacuuming, wet cleaning, and air monitoring. This is also termed end removal, as the contaminants remain until the eventual demolition of the building.

PCBs. Polychlorinated biphenyls. Sometimes found in electrical or hydraulic equipment.

PCE. Perchloroethylene or tetrachloroethylene, nicknamed perk. A solvent often used for dry cleaning and other uses.

permeability. A measure of a material's ability to transmit water.

pickleweed. A salt marsh vegetation.

permit issues. Any issue were a question exists as to the proper use of building or other construction permits as relating to the improvements to a property. This includes improvements that were constructed without a permit.

pipeline easement. The right or privilege to install and maintain a pipeline on a property. Can be considered a potential detrimental condition if the market reacts negatively towards the risks associated with a pipeline explosion or leak.

plume. The areas that are saturated or impacted by underground contaminants.

prescriptive easement. The securing of easement rights through adverse possession.

PRG. Nonofficial preliminary risk goals set forth by the U.S. Environmental Protection Agency regarding soil contamination.

pollutant. A contaminant, such as dredged soil, solid waste, incinerator residue, filter backwash, sewage, garbage, sewage sludge, munitions, chemical wastes, biological materials, or radioactive materials.

potable water supply. A water supply that is fit for human consumption.

private REO. Property that has been foreclosed and owned by a private lender.

process wastes. Any designated pollutant resulting from a manufacturing process.

project incentive. The risk, if any, associated with the repair stage of a detrimental condition analysis.

protected species or vegetation. Any plant or animal that has been designated by a governmental agency to be safeguarded. This designation may limit or restrict development.

quicksand. A soil type that creates a mire whereby a person or animal walking over the area will sink. May both create a hazard and limit the developability of a site.

recharge. Any process whereby water is added to the saturated zone of an aquifer.

reciprocal parking easement. The contractual right of two adjacent parties to share parking with the other.

release. A spill, leak, emission, discharge, escape, leach, or disposal from an underground storage tank into the soils, ground, or surface water.

repair stage. The second stage in detrimental condition analysis. It includes all the costs of repairs or remediation resulting from a detrimental condition, including the repair and incidental costs, contingencies, use issues, and the project incentive.

retaining slope. A mound of soil that is designed to hold back the ground behind it.

retaining wall. A wall that is designed to hold back the ground behind it.

retrofit. The renovation of a property to a higher standard. For example, an old brick building may be retrofitted to withstand an earthquake.

reverse osmosis. A water purification process used to remove salts, such as for sea water. The process yields drinking water and salt residues.

riparian habitats. Areas in water courses that are the home of associated animal and plant life.

risk issues. All risks associated with a detrimental condition analysis, specifically within the assessment stage (uncertainty factor), the repair stage (project incentive), and ongoing stage (market resistance).

rolling option. An option to lease or purchase a property that continues or "rolls over" based upon specified conditions.

RTC Sale. The sale of property by the Resolution Trust Corporation.

salt flat. A site with poor drainage where the water evaporates, leaving salt behind.

Santa Claus factor. A slang term used to describe a situation where the repaired property is better than the improvements that were damaged or destroyed.

saturated zone or zone of saturation. Soils in which all voids are filled with water.

sea water percolation. Underground sea water that passes through soils and seeps to ground level.

sedimentation. A prefiltering process for removal of solids by gravity or separation.

shear strength. An engineering term used to describe a soil or structure to resist applied forces that causes or tends to cause two contiguous parts of a body to slide relative to each other.

sheen. A glistening appearance on the water surface from oil residue.

Sick Building Syndrome. See indoor air quality problem.

site grading. The leveling of land for development.

slow sand filtration. A process whereby water is drained through a bed of sand at low velocity, removing particles by physical and biological mechanisms.

sludge. A solid, semisolid, or liquid waste generated from a waste water treatment plant, less the treated effluent.

soft water. Water that contains low levels of dissolved minerals, such as salts, calcium, or magnesium.

soil. All unconsolidated materials naturally found at the surface of the earth, such as clays, silts, sands, and small rocks.

soil compaction. Fill soils that have been pressed to avoid subsidence.

soil excavation. A type of remediation process that involves the digging of contaminated soil from the subsurface, where it is treated or disposed of.

solder. A metal compound used to seal plumbing joints. Solder compounds containing lead are now banned.

stigma. See market resistance, project incentive, or uncertainty factor.

storage tanks. Aboveground or underground tanks that are used for storing fluids, such as gasoline or propane.

stratum. A sedimentary bed or layer that generally consists of the same kind of soils or rock material.

stressed vegetation. Plants that have been damaged.

sulfates. A potentially corrosive, and naturally forming, substance found within certain soils. May cause concrete foundations to erode.

super-surface construction defect. The failure to properly construct some component of the improvements.

surface water. All water that is open to atmosphere.

surfactant. Wetting agent that enhances the penetration of water.

surging soil. Soils that are upheaving.

SVOC. Semi-volatile organic compounds.

TCA. Trichloroethane, a solvent.

TCE. Trichloroethylene, or trichloroethene, a solvent.

takedown. The purchase of property, often large tracts of land, in phases.

temporary construction easement. The incidental and interim use of a property or a portion of a property, through eminent domain, to use the property while construction is underway.

tidal influence. An oceanfront area that is affected by tides.

torrent. A downpour of rain that may cause flooding.

toxic waste. The disposal of a hazardous material in such a way that it threatens plants, animals, or humans.

toxicity. The level to which a substance is toxic.

TPH. Total petroleum hydrocarbons, typically measured by levels of BTXE.

traffic diminution. The loss of vehicular or pedestrian traffic. Can be either a permanent or temporary issue.

treatment zone. A soil area of the unsaturated zone of a land treatment unit within which hazardous constituents are degraded, transformed, or immobilized. TRPH. Total recoverable petroleum hydrocarbons.

uncertainty factor. The risks, if any, associated with the assessment stage of a detrimental condition analysis.

unchlorinated solvents. Cleaning solutions to which no chlorine has been added.

unidentified substance containers. A drum or other container holding unidentified substances suspected of being hazardous or containing petroleum products.

unimpaired value. The value as if no detrimental condition exists.

unsaturated zone or zone of aeration. The area between the land surface and the groundwater table.

uplands. An area above and adjacent to the high tide level.

urban decay. The deterioration of infrastructure and improvements within a metropolitan area.

use issues. All losses associated with the use of the property during the assessment, repair, and ongoing stages of a detrimental condition analysis.

USDW. Underground source of drinking water.

utility disruption. The temporary interruption of utilities, such as water, electricity, gas, etc.

utility easement. The rights granted to use a portion of a property for utility lines.

vacuum extraction. A type of remediation process that removes the majority of contaminants through the use of one or more suction wells, or a series of air injection and suction wells. The method is typically less disruptive than soil excavation and may be less expensive than other techniques involving excavation.

vandalism. The intentional defacing or destruction of property.

variance. The right granted by a city or municipality to develop or use a property in a way that varies from the typical or stated requirements.

view diminution. The partial or entire loss of a view amenity.

violent crime. A property where a violent crime was committed on the premises.

VOC. Volatile organic compounds.

waste water. A liquid (including storm water) that discharges into a tunnel, drain, ditch, or stream.

water intrusion. The undesired influx of water onto a site or into improvements.

water table. The upper level of the saturated zone of groundwater.

worker decontamination enclosure system. A series of three temporary rooms for entering or exiting a contaminated work site. They are the clean room (adjacent to the outside or uncontaminated area), the shower room, and the equipment room (dirty room).

woodrot. A situation where a wood structure has become moist and decayed.

x-ray release. The undesired discharge of radiograms.

What is claimed is:

1. A real estate disclosure reporting method comprising the steps of:
   compiling a plurality of items of disclosure;
   relating said items of disclosure according to a plurality of condition categories;
   researching a particular property to determine a plurality of known ones of said items of disclosure; and
   disclosing said known ones according to said condition categories.

2. The real estate disclosure reporting method according to claim 1 wherein at least some of said items of disclosure are flood and natural hazard conditions.

3. The real estate disclosure reporting method according to claim 2 wherein at least some of said items of disclosure are contamination and hazardous waste site conditions.

4. The real estate disclosure reporting method according to claim 3 wherein at least some of said items of disclosure are landslide and liquefaction conditions.

5. The real estate disclosure reporting method according to claim 1 wherein said researching step comprises the substep of accessing at least one of government records and police records.

6. The real estate disclosure reporting method according to claim 1 wherein said disclosing step comprises the substeps of:
   reporting known flood conditions associated with said property;
   reporting known landslide conditions associated with said property; and
   reporting known liquefaction conditions associated with said property.

7. The real estate disclosure reporting method according to claim 6 wherein said disclosing step comprises the substeps of:
   reporting known leaking underground storage tanks proximate said property; and
   reporting known hazardous waste facilities proximate said property.

8. The real estate disclosure reporting method according to claim 7 wherein said disclosing step comprises the substep of reporting known solid waste facilities proximate said property.

9. A real estate disclosure reporting method comprising the steps of:
   providing a web page media;
   listing a plurality of known items of disclosure for a specific property on said web page media;
   categorizing said known items of disclosure on said web page media according to a plurality of real estate conditions; and
   downloading said web page media to a browser over the Internet.

10. The real estate disclosure reporting method according to claim 9 comprising the further step of accessing an Internet-searchable database so as to determine at least some of said known items of disclosure.

11. The real estate disclosure reporting method according to claim 9 comprising the further step of utilizing a real-estate-based Internet information provider so as to determine at least some of said known items of disclosure.

12. The real estate disclosure reporting method according to claim 9 wherein said real estate conditions comprise site conditions, environmental conditions and natural conditions.

13. The real estate disclosure reporting method according to claim 12 wherein:
   said site conditions comprise at least one of landslide conditions and liquefaction conditions,
   said environmental conditions comprise at least one of contaminated sites, hazardous material and solid waste facilities, and
   said natural conditions comprise flood hazard conditions.

14. The real estate disclosure reporting method according to claim 9 comprising the further step of providing background for said specific property.

15. The real estate disclosure reporting method according to claim 9 comprising the further step of downloading at least one of a map and an aerial photograph including said specific property.

16. A real estate disclosure reporting method comprising the steps of:
   identifying a subject property;
   researching said property to determine a plurality of known items of disclosure; and
   reporting said known items of disclosure according to a plurality of condition categories.

17. The real estate disclosure reporting method according to claim 16 wherein said researching step comprises the substep of determining actual and potential contamination issues related to said property.

18. The real estate disclosure reporting method according to claim 16 wherein said researching step comprises the substep of determining the geotechnical condition of said property.

19. The real estate disclosure reporting method according to claim 16 wherein said researching step comprises the substep of determining wildlife and habitat issues related to said property.

20. The real estate disclosure reporting method according to claim 16 wherein said researching step comprises the substep of determining any tragedy associated with said property.

* * * * *